(12) United States Patent
Kubo et al.

(10) Patent No.: US 12,181,812 B2
(45) Date of Patent: Dec. 31, 2024

(54) ENDLESS BELT, TRANSFER DEVICE, AND IMAGE FORMING APPARATUS

(71) Applicant: FUJIFILM Business Innovation Corp., Tokyo (JP)

(72) Inventors: Yosuke Kubo, Kanagawa (JP); Toshiyasu Yukawa, Kanagawa (JP); Hiroaki Tanaka, Kanagawa (JP); Shigeru Fukuda, Kanagawa (JP); Daisuke Tanemura, Kanagawa (JP); Masato Ono, Kanagawa (JP); Masato Furukawa, Kanagawa (JP); Masayuki Seko, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 59 days.

(21) Appl. No.: 17/949,456

(22) Filed: Sep. 21, 2022

(65) Prior Publication Data

US 2023/0259056 A1   Aug. 17, 2023

(30) Foreign Application Priority Data

Feb. 15, 2022   (JP) ................................. 2022-021497

(51) Int. Cl.
 *G03G 15/16*   (2006.01)
 *C09D 7/61*    (2018.01)
 *C09D 7/65*    (2018.01)
 *C09D 179/08*  (2006.01)

(52) U.S. Cl.
 CPC ............. *G03G 15/162* (2013.01); *C09D 7/61* (2018.01); *C09D 7/65* (2018.01); *C09D 179/08* (2013.01)

(58) Field of Classification Search
 CPC ........... C09D 7/61; C09D 7/65; C09D 179/08
 See application file for complete search history.

(56) References Cited

U.S. PATENT DOCUMENTS

| | | | |
|---|---|---|---|
| 2015/0076413 A1* | 3/2015 | Wu | G03G 15/162 252/511 |
| 2015/0323888 A1* | 11/2015 | Sakamoto | G03G 15/162 399/302 |
| 2020/0310302 A1* | 10/2020 | Suzuki | G03G 5/14726 |
| 2021/0373448 A1* | 12/2021 | Fushimoto | G03G 15/1685 |
| 2022/0373939 A1* | 11/2022 | Tanaka | G03G 15/161 |

FOREIGN PATENT DOCUMENTS

| | | |
|---|---|---|
| JP | 2007-011117 A | 1/2007 |
| JP | 2007-078789 A | 3/2007 |

OTHER PUBLICATIONS

Safety Data Sheet of Krytox PFPE Oils (Year: 2016).*

* cited by examiner

*Primary Examiner* — Carla J Therrien
(74) *Attorney, Agent, or Firm* — Sughrue Mion, PLLC

(57) ABSTRACT

An endless belt contains a resin and a surface modifier. The endless belt has, at an outer circumferential surface thereof, a sea-island structure including a sea portion containing the resin and island portions containing the surface modifier. The area of the island portions is equal to or less than 5% of the total area of the outer circumferential surface.

21 Claims, 2 Drawing Sheets

ENDLESS BELT, TRANSFER DEVICE, AND IMAGE FORMING APPARATUS

CROSS-REFERENCE TO RELATED APPLICATIONS

This application is based on and claims priority under 35 USC 119 from Japanese Patent Application No. 2022-021497 filed Feb. 15, 2022.

BACKGROUND

(i) Technical Field

The present disclosure relates to an endless belt, a transfer device, and an image forming apparatus.

(ii) Related Art

In electrophotographic image forming apparatuses (such as copiers, facsimiles, and printers), a toner image formed on a surface of an image holding member is transferred onto a surface of a recording medium and fixed on the recording medium to form an image. To transfer a tone image onto a recording medium, an electrically conductive endless belt such as an intermediate transfer belt is used.

For example, Japanese Unexamined Patent Application Publication No. 2007-011117 discloses "an intermediate transfer belt including at least a surface layer on a substrate, wherein the surface layer contains aggregates of electrically conductive particles having an average particle diameter of 0.5 to 25 µm."

Japanese Unexamined Patent Application Publication No. 2007-078789 discloses "an intermediate transfer belt including at least a surface layer on a substrate, wherein the surface layer contains metal-coated fine resin particles."

SUMMARY

In a transfer device that uses an endless belt as an intermediate transfer body, when a recording medium having large surface irregularities such as embossed paper (hereinafter referred to also as a "non-smooth paper sheet") is used, the intermediate transfer body cannot follow the irregularities of the recording medium when a toner image is transferred from the intermediate transfer body onto the recording medium. In this case, transferability deteriorates, so that white patches may be formed in the image.

Aspects of non-limiting embodiments of the present disclosure relate to an endless belt that contains a resin and a surface modifier and has, at the outer circumferential surface thereof, a sea-island structure including a sea portion containing the resin and island portions containing the surface modifier. When the endless belt is used as an intermediate transfer body, transferability onto a non-smooth paper sheet is better than that of an endless belt in which the area of the island portions is larger than 5% or in which the average equivalent circle diameter of the island portions is larger than 1.5 µm.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an endless belt containing: a resin; and a surface modifier, wherein the endless belt has, at an outer circumferential surface thereof, a sea-island structure including a sea portion containing the resin and island portions containing the surface modifier, and wherein the area of the island portions is equal to or less than 5% of the total area of the outer circumferential surface.

BRIEF DESCRIPTION OF THE DRAWINGS

Exemplary embodiments of the present disclosure will be described in detail based on the following figures, wherein.

DETAILED DESCRIPTION

Figure 1:
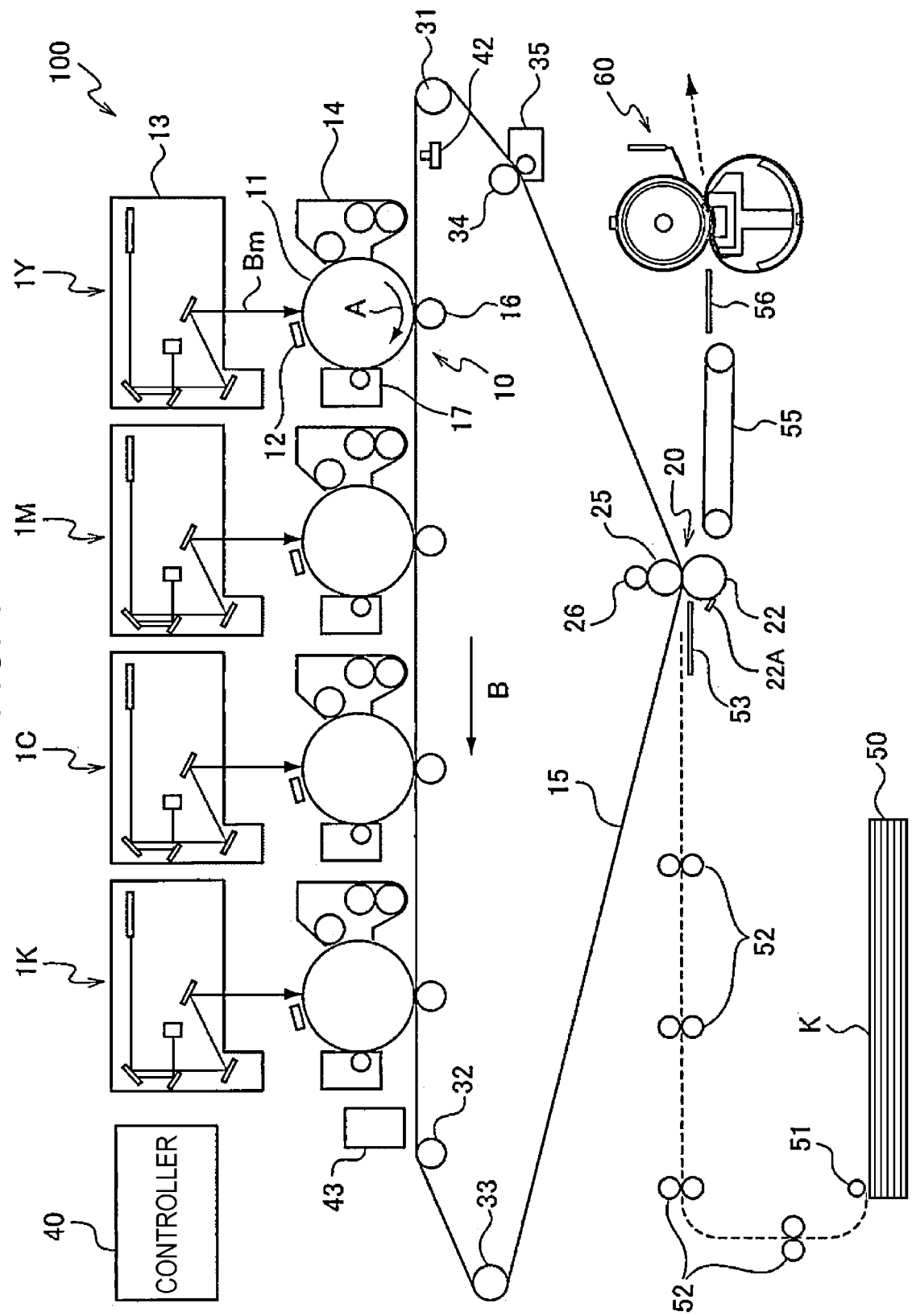
FIG. 1 is a schematic illustration showing an example of an image forming apparatus according to an exemplary embodiment.

Exemplary embodiments of the disclosure will be described below. The following description and Examples are illustrative of the exemplary embodiments and are not intended to limit the scope of the exemplary embodiments.

In a set of numerical ranges expressed in a stepwise manner in an exemplary embodiment, the upper or lower limit in one numerical range may be replaced with the upper or lower limit in another numerical range in the set. Moreover, in a numerical range described in an exemplary embodiment, the upper or lower limit in the numerical range may be replaced with a value indicated in an Example.

In the exemplary embodiments, the term "step" is meant to include not only an independent step but also a step that is not clearly distinguished from other steps, so long as the prescribed purpose of the step can be achieved.

In each exemplary embodiment, when the exemplary embodiment is explained with reference to the drawings, the structure of the exemplary embodiment is not limited to the structure shown in the drawings. In the drawings, the sizes of the components are conceptual, and the relative relations between the components are not limited to the illustrated relations.

In each exemplary embodiment, any component may contain a plurality of materials corresponding to the component. In each exemplary embodiment, when reference is made to the amount of a component in a composition, if the composition contains a plurality of materials corresponding to the component, the amount means the total amount of the plurality of materials, unless otherwise specified.

Endless Belt

First Exemplary Embodiment

An endless belt according to a first exemplary embodiment contains a resin and a surface modifier and has, at the outer circumferential surface of the endless belt, a sea-island structure including a sea portion containing the resin and island portions containing the surface modifier. The area of the island portions is equal to or less than 5% of the total area of the outer circumferential surface.

The ratio of the area of the island portions to the total area of the outer circumferential surface may be hereinafter referred to also as the "area fraction of the island portions."

In an image forming apparatus that uses an endless belt as an intermediate transfer body, when a non-smooth paper sheet is used as a recording medium, the intermediate transfer body may not follow the irregularities of the recording medium when a toner image is transferred from the intermediate transfer body onto the recording medium. In this case, transferability deteriorates, so that white patches may be formed in the image.

In particular, the non-electrostatic adhesion formed between the toner and the outer circumferential surface of the endless belt used as the intermediate transfer body can be strong in some cases. In this case, the transferability deteriorates when a non-smooth paper sheet is used as a recording medium, so that white patches may be formed in the image. This may be because surfaces of recessed portions of the non-smooth paper sheet do not easily come into contact with the toner image formed on the outer circumferential surface of the intermediate transfer body.

One possible method for reducing the non-electrostatic adhesion formed between the outer circumferential surface of the endless belt and the toner is to add a surface modifier serving as a low-adhesion agent to the endless belt.

However, when the endless belt contains the surface modifier, a sea-island structure including a sea portion containing the resin and island portions containing the surface modifier is formed at the outer circumferential surface of the endless belt. Since the island portions at the outer circumferential surface contain the surface modifier, charges are easily accumulated in the island portions. In this case, electrostatic adhesion increases, and a toner image is not easily transferred in some cases. When the toner image is not easily transferred due to the increase in the electrostatic adhesion, white patches may be formed in the image.

However, in the first exemplary embodiment, the area fraction of the island portions is 5% or less. Therefore, the increase in electrostatic adhesion at the outer circumferential surface of the endless belt is less likely to occur than when the area fraction of the island portions exceeds 5%, so that the occurrence of white patches in an image due to the increase in electrostatic adhesion is prevented. Specifically, when the surface modifier is contained, the non-electrostatic adhesion is reduced, and the increase in the electrostatic adhesion due to accumulation of charges is prevented. This allows high transferability of a toner image and may prevent the occurrence of white patches in the image.

This may be the reason that, when the endless belt according to the first exemplary embodiment is used as an intermediate transfer body, the transferability onto a non-smooth paper sheet is high.

Second Exemplary Embodiment

An endless belt according to a second exemplary embodiment contains a resin and a surface modifier and has, at the outer circumferential surface of the endless belt, a sea-island structure including a sea portion containing the resin and island portions containing the surface modifier, and the average equivalent circle diameter of the island portions is 1.5 µm or less.

As described above, in a transfer device that uses an endless belt as an intermediate transfer body, when a non-smooth paper sheet is used as a recording medium, the intermediate transfer body cannot follow the irregularities of the recording medium when a toner image is transferred from the intermediate transfer body onto the recording medium. In this case, transferability deteriorates, so that white patches may be formed in the image.

When the endless belt contains the surface modifier in order to reduce the non-electrostatic adhesion formed between the outer circumferential surface of the endless belt and the toner, the sea-island structure is formed at the outer circumferential surface of the endless belt. In this case, the electrostatic adhesion increases because of accumulation of charges in the island portions, and the toner image is not easily transferred in some cases.

However, in the second exemplary embodiment, the average equivalent circle diameter of the island portions is 1.5 µm or less. Therefore, the amount of charges accumulated per island portion is less likely to increase than when the average equivalent circle diameter of the island portions is more than 1.5 µm, and the increase in the electrostatic adhesion due to accumulation of charges is unlikely to occur, so that the occurrence of white patches in an image is prevented. Specifically, when the surface modifier is contained, the non-electrostatic adhesion is reduced, and the increase in the electrostatic adhesion due to accumulation of charges is prevented. It is therefore inferred that the transferability of a toner image is high and white patches is unlikely occur in the image.

This may be the reason that, when the endless belt according to the second exemplary embodiment is used as an intermediate transfer body, the transferability onto a non-smooth paper sheet is good.

In the following description, an endless belt that corresponds to both the endless belt according to the first exemplary embodiment and the endless belt according to the second exemplary embodiment is referred to as an "endless belt according to the present exemplary embodiment." However, it is only necessary that an example of the endless belt of the present disclosure be an endless belt corresponding to at least one of the endless belt according to the first exemplary embodiment and the endless belt according to the second exemplary embodiment.

The endless belt according to the present exemplary embodiment will next be described in detail.

<Sea-Island Structure>

The endless belt in the present exemplary embodiment has, at its outer circumferential surface, the sea-island structure including the sea portion containing the resin and the island portions containing the surface modifier. Hereinafter, the sea portion containing the resin may be referred to simply as the "sea portion," and the island portions containing the surface modifier may be referred to simply as the "island portions."

The island portions are, for example, isolated regions in which the content of the surface modifier is higher than that in the sea portion. The island portions may or may not contain a component other than the surface modifier (e.g., a resin). The content of the surface modifier in the island portions is, for example, 10% by mass or more, may be 30% by mass or more, and may be 50% by mass or more.

It is only necessary that the sea portion contain at least the resin, and the sea portion may contain a component other than the resin. The sea portion may contain the surface modifier as the component other than the resin or may contain an additive other than the surface modifier. When the sea portion contains the surface modifier, the content of the surface modifier in the sea portion may be smaller than the content of the surface modifier in the island portions.

It is only necessary that the outer circumferential surface of the endless belt include at least the sea portion and the island portions, and the outer circumferential surface may include additional regions other than the sea portion and the island portions. When, for example, the endless belt contains electrically conductive particles, the outer circumferential surface may include, as the additional regions, regions including the electrically conductive particles.

The following methods are used to check the presence of the sea-island structure, measure the area fraction of the island portions, and measure the average equivalent circle diameter of the island portions.

A scanning electron microscope (SEM) is used to observe the outer circumferential surface of the endless belt in a measurement viewing field of 90 μm×120 μm at a measurement magnification of 1000× and an acceleration voltage of 5 kV. Specifically, the observation is performed at a total of three positions on the outer circumferential surface of the endless belt, i.e., three different circumferential positions at the same axial position. The scanning electron microscope used for the measurement is, for example, JSM-6700 manufactured by JEOL Ltd. The sea portion and the island portions are distinguished from each other by binarizing the difference in image density due to the difference in the content of the surface modifier.

When 100 or more island portions are found in the SEM images taken at the three positions, the outer circumferential surface of the endless belt is considered to have the sea-island structure.

The area fraction of the island portions is computed from the total area of the SEM images taken at the three positions and the total area of the island portions found in the SEM images taken at the three positions.

The average equivalent circle diameter of the island portions is determined by randomly selecting 100 island portions from the island portions found in the SEM images taken at the three positions, determining the equivalent circle diameters of the selected island portions, and averaging the equivalent circle diameters. When the number of island portions found in the SEM images taken at the three positions is less than 100, the quotient obtained by dividing the sum of the equivalent circle diameters of the less than 100 observed island portions by 100 is used as the average equivalent circle diameter.

The content of the surface modifier in the island portions is determined by cutting the surface layer and subjecting the cut surface layer to EDX analysis (detecting characteristic X-rays generated by irradiation with an electron beam to perform energy spectral analysis) using a scanning electron microscope (SEM) to perform elementary analysis and compositional analysis. The analyzer used may be JPS-9000MX manufactured by JEOL Ltd. with the following measurement conditions: X-ray source: MgKα, acceleration voltage: 10 kV, emission current: 30 mA. The content of the surface modifier in the sea portion is measured using the same method as the method for measuring the content of the surface modifier in the island portions.

The area fraction of the island portions in the endless belt in the first exemplary embodiment is 5% or less, preferably 2.5% or less, and more preferably 1.6% or less. The lower the area fraction, the better.

The area fraction of the island portions in the endless belt in the second exemplary embodiment is preferably 5% or less, more preferably 2.5% or less, and still more preferably 1.6% or less. The lower the area fraction, the better.

The average equivalent circle diameter of the island portions in the endless belt in the first exemplary embodiment is preferably 1.5 μm or less, more preferably 1.0 μm or less, still more preferably 0.8 μm or less, and particularly preferably 0.3 μm or less. The smaller the average equivalent circle diameter, the better.

The average equivalent circle diameter of the island portions in the endless belt in the second exemplary embodiment is 1.5 μm or less, preferably 1.0 μm or less, more preferably 0.8 μm or less, and still more preferably 0.3 μm or less. The smaller the average equivalent circle diameter, the better.

In the endless belt in the present exemplary embodiment, it is preferable that the area fraction of the island portions is 5% or less and the average equivalent circle diameter of the island portions is 1.5 μm or less. It is more preferable that the area fraction of the island portions is 2.5% or less and the average equivalent circle diameter of the island portions is 1.0 μm or less. It is still more preferable that the area fraction of the island portions is 2.5% or less and the average equivalent circle diameter of the island portions is 0.8 μm or less. It is particularly preferable that the area fraction of the island portions is 1.6% or less and the average equivalent circle diameter of the island portions is 0.3 μm or less.

One method for obtaining an endless belt in which the area fraction of the island portions is within the above range or an endless belt in which the average equivalent circle diameter of the island portions is within the above range is, for example, a method in which the type of surface modifier contained in the endless belt (for example, the difference in SP between the surface modifier and the resin described later, thermal decomposition starting temperature, etc.), the amount of the surface modifier contained in the endless belt, heating conditions in the process of producing the endless belt (for example, drying temperature, drying time, etc. in the step of drying a coating film of a layer-forming coating solution), etc. are controlled.

<Layer Structure>

The endless belt according to the present exemplary embodiment contains the resin (hereinafter referred to also as a "first resin") and the surface modifier.

The endless belt may be a single-layer belt or a layered belt. Specifically, the endless belt is a single-layer belt composed of a layer containing the first resin and the surface modifier or a layered belt including the above layer as a surface layer forming the outer circumferential surface of the endless belt.

When the endless belt is a single-layer belt, the single-layer belt is the layer containing the first resin and the surface modifier. The single-layer belt may further contain electrically conductive particles. In the present specification, the electrical conductivity means that the volume resistivity at 20° C. is less than $1 \times 10^{13}$ Ω cm.

When the endless belt is a layered belt, the layered belt includes, for example, a base layer and a surface layer disposed on the base layer. The surface layer is the outermost layer of the endless belt. The layered belt may include an additional layer between the base layer and the surface layer.

When the endless belt is a layered belt including a base layer and a surface layer, the surface layer is a layer containing the first resin and the surface modifier. The surface layer may further contain electrically conductive particles. No particular limitation is imposed on the base layer, and examples thereof include a layer containing a second resin.

The layer in a single-layer endless belt is hereinafter referred to also as a "single layer." In a layered endless belt, the surface layer containing the first resin and the surface modifier is referred to also as a "first layer," and the base layer containing the second resin is referred to also as a "second layer."

<Resins>

Examples of the first resin contained in the single layer or the first layer include polyimide resins (PI resins), polyamide-imide resins (PAI resins), aromatic polyether ketone resins (such as aromatic polyether ether ketone resins), polyphenylene sulfide resins (PPS resins), polyetherimide resins (PEI resins), polyester resins, polyamide resins, and polycarbonate resins. Preferably, the first resin includes at least one selected from the group consisting of polyimide resins, polyamide-imide resins, aromatic polyether ether ketone resins, polyetherimide resins, and polyphenylene sulfide resins, from the viewpoint of mechanical strength. More preferably, the first resin includes at least one selected from the group consisting of polyimide resins and polyamide-imide resins. In particular, from the viewpoint of mechanical strength, polyimide resins are still more preferable. The first resin may be composed of one resin or may be a mixture of two or more resins.

Specific examples and preferred examples of the second resin contained in the second layer are the same as the specific examples and the preferred examples of the first resin. The second resin may be composed of one resin or may be a mixture of two or more resins.

When the endless belt includes the first layer and the second layer, the first resin and the second resin may be the same resin or different resins and are preferably the same resin (for example, the first resin and the second resin are both a polyimide resin).

(Polyimide Resins)

Examples of the polyimide resins include imidized products of polyamic acids (precursors of polyimide resins) that are polymers of tetracarboxylic dianhydrides and diamine compounds.

Examples of the polyimide resins include resins having a structural unit represented by the following general formula (I).

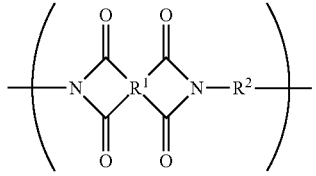

General formula (I)

In general formula (I), $R^1$ represents a tetravalent organic group, and $R^2$ represents a divalent organic group.

Examples of the tetravalent organic group represented by $R^1$ include aromatic groups, aliphatic groups, alicyclic groups, combinations of aromatic and aliphatic groups, and substituted groups thereof. Specific examples of the tetravalent organic group include residues of tetracarboxylic dianhydrides described later.

Examples of the divalent organic group represented by $R^2$ include aromatic groups, aliphatic groups, alicyclic groups, combinations of aromatic and aliphatic groups, and substituted groups thereof. Specific examples of the divalent organic group include residues of diamine compounds described later.

Specific examples of the tetracarboxylic dianhydride used as a raw material of the polyimide resin include pyromellitic dianhydride, 3,3',4,4'-benzophenonetetracarboxylic dianhydride, 3,3',4,4'-biphenyltetracarboxylic dianhydride, 2,3,3',4-biphenyltetracarboxylic dianhydride, 2,3,6,7-naphthalenetetracarboxylic dianhydride, 1,2,5,6-naphthalenetetracarboxylic dianhydride, 1,4,5,8-naphthalenetetracarboxylic dianhydride, 2,2'-bis(3,4-dicarboxyphenyl)sulfonic dianhydride, perylene-3,4,9,10-tetracarboxylic dianhydride, bis(3,4-dicarboxyphenyl)ether dianhydride, and ethylenetetracarboxylic dianhydride.

Specific examples of the diamine compound used as a raw material of the polyimide resin include 4,4'-diaminodiphenyl ether, 4,4'-diaminodiphenylmethane, 3,3'-diaminodiphenylmethane, 3,3'-dichlorobenzidine, 4,4'-diaminodiphenyl sulfide, 3,3'-diaminodiphenylsulfone, 1,5-diaminonaphthalene, m-phenylenediamine, p-phenylenediamine, 3,3'-dimethyl-4,4'-biphenyldiamine, benzidine, 3,3'-dimethylbenzidine, 3,3'-dimethoxybenzidine, 4,4'-diaminodiphenylsulfone, 4,4'-diaminodiphenylpropane, 2,4-bis(β-amino-tert-butyl)toluene, bis(p-β-amino-tert-butylphenyl)ether, bis(p-β-methyl-δ-aminophenyl)benzene, bis-p-(1,1-dimethyl-5-amino-pentyl)benzene, 1-isopropyl-2,4-m-phenylenediamine, m-xylylenediamine, p-xylylenediamine, di(p-aminocyclohexyl)methane, hexamethylenediamine, heptamethylenediamine, octamethylenediamine, nonamethylenediamine, decamethylenediamine, diaminopropyltetramethylene, 3-methylheptamethylenediamine, 4,4-dimethylheptamethylenediamine, 2,11-diaminododecane, 1,2-bis-3-aminopropoxyethane, 2,2-dimethylpropylenediamine, 3-methoxyhexamethylenediamine, 2,5-dimethylheptamethylenediamine, 3-methylheptamethylenediamine, 5-methylnonamethylenediamine, 2,17-diaminoeicosadecane, 1,4-diaminocyclohexane, 1,10-diamino-1,10-dimethyldecane, 12-diaminooctadecane, 2,2-bis[4-(4-aminophenoxy)phenyl]propane, piperazine, $H_2N(CH_2)_3O(CH_2)_2O(CH_2)NH_2$, $H_2N(CH_2)_3S(CH_2)_3NH_2$, and $H_2N(CH_2)_3N(CH_3)_2(CH_2)_3NH_2$.

(Polyamide-Imide Resin)

Examples of the polyamide-imide resin include resins having a repeating unit including an imide bond and an amide bond.

More specific examples of the polyamide-imide resin include a polymer of a trivalent carboxylic acid compound (referred to also as a tricarboxylic acid) having an acid anhydride group with a diisocyanate compound or a diamine compound.

The tricarboxylic acid may be trimellitic anhydride or a derivative thereof. The tricarboxylic acid may be used in combination with a tetracarboxylic dianhydride, an aliphatic dicarboxylic acid, an aromatic dicarboxylic acid, etc.

Examples of the diisocyanate compound include 3,3'-dimethylbiphenyl-4,4'-diisocyanate, 2,2'-dimethylbiphenyl-4,4'-diisocyanate, biphenyl-4,4'-diisocyanate, biphenyl-3,3'-diisocyanate, biphenyl-3,4'-diisocyanate, 3,3'-diethylbiphenyl-4,4'-diisocyanate, 2,2'-diethylbiphenyl-4,4'-diisocyanate, 3,3'-dimethoxybiphenyl-4,4'-diisocyanate, 2,2'-dimethoxybiphenyl-4,4'-diisocyanate, naphthalene-1,5-diisocyanate, and naphthalene-2,6-diisocyanate.

Examples of the diamine compound include compounds that have structures similar to the structures of the above isocyanates and have amino groups instead of the isocyanato groups.

(Aromatic Polyether Ketone Resin)

Examples of the aromatic polyether ketone resin include a resin in which aromatic rings such as benzene rings are linearly bonded through ether and ketone bonds.

Examples of the aromatic polyether ketone resin include polyether ketones (PEK) in which ether bonds and ketone bonds are alternately arranged, polyether ether ketones (PEEK) including a repeating unit including an ether bond, another ether bond, and a ketone bond arranged in this order, polyether ketone ketones (PEKK) including a repeating unit including an ether bond, a ketone bond, and another ketone bond arranged in this order, polyether ether ketone (PEEKK) including a repeating unit including an ether bond, another ether bond, a ketone bond, and another ketone bond arranged in this order, and polyether ketone esters including an ester bond.

From the viewpoint of controlling strength, volume resistivity, etc., the content of the first resin with respect to the total mass of the single layer is preferably from 60% by mass to 95% by mass inclusive, more preferably from 70% by mass to 95% by mass inclusive, and still more preferably from 75% by mass to 90% by mass inclusive.

From the viewpoint of controlling strength, volume resistivity, etc., the content of the first resin with respect to the total mass of the first layer is preferably from 60% by mass to 95% by mass inclusive, more preferably from 70% by mass to 95% by mass inclusive, and still more preferably from 75% by mass to 90% by mass inclusive.

From the viewpoint of controlling strength, volume resistivity, etc., the content of the second resin with respect to the total mass of the second layer is preferably from 60% by mass to 95% by mass inclusive, more preferably from 70% by mass to 95% by mass inclusive, and still more preferably from 75% by mass to 90% by mass inclusive.

<Surface Modifier>

Examples of the surface modifier include a surface modifier having a silicone structure, a surface modifier having a fluorine atom, and a surface modifier having an alkylene oxide structure. Of these, a surface modifier having a silicone structure and a surface modifier having a fluorine atom may be used.

The surface modifier may include at least one selected from the group consisting of a surface modifier having a silicone structure and a surface modifier having a fluorine atom, from the viewpoint of reducing non-electrostatic adhesion of the outer circumferential surface of the endless belt. Only one surface modifier may be used, or a combination of two or more may be used.

(Surface Modifier Having Silicone Structure)

Examples of the surface modifier having a silicone structure include silicone oils such as dimethyl silicone, methylphenyl silicone, diphenyl silicone, and derivatives thereof. The surface modifier having a silicone structure is preferably dimethyl silicone or modified dimethyl silicone and more preferably modified dimethyl silicone, from the viewpoint of reducing the non-electrostatic adhesion of the outer circumferential surface of the endless belt.

When the single layer or the first layer in the endless belt contains modified dimethyl silicone as the surface modifier, the surface free energy is reduced, and water repellency and oil repellency are imparted. Although the reason for this is unclear, the reason may be that methyl groups on the surface of the endless belt reduce the surface free energy to impart water repellency and oil repellency.

Examples of the modified dimethyl silicone include polyether-modified dimethyl silicones, aliphatic ester-modified dimethyl silicones, fluorine-modified dimethyl silicones, and alkyl-modified dimethyl silicones. Of these, polyether-modified dimethyl silicones may be used as the modified dimethyl silicone.

Commercial examples of the modified dimethyl silicone include the KP series (manufactured by Shin-Etsu Chemical Co., Ltd.), the TSF series (manufactured by Momentive Performance Materials Inc.), and the BYK series and the UV series (manufactured by BYK-Chemie Japan).

The lower limit of the thermal decomposition starting temperature of the modified dimethyl silicone is preferably 200° C. or higher, more preferably 230° C. or higher, and still more preferably 250° C. or higher. The upper limit of the thermal decomposition starting temperature of the modified dimethyl silicone is preferably 300° C. or lower, more preferably 280° C. or lower, and still more preferably 270° C. or lower.

When the thermal decomposition starting temperature of the modified dimethyl silicone is within the above range, the area fraction of the island portions and the average equivalent circle diameter of the island portions are more likely to fall within the above ranges than when the thermal decomposition starting temperature is higher than the above range, and the endless belt obtained tends to exhibit better transferability onto a non-smooth paper sheet when used as an intermediate transfer body. Although the reason for this is unclear, the reason may be that the modified dimethyl silicone whose thermal decomposition starting temperature is within the above range is more easily dispersed in the resin than a modified dimethyl silicone whose thermal decomposition starting temperature is higher than the above range.

When the thermal decomposition starting temperature of the modified dimethyl silicone is within the above range, the area fraction of the island portions and the average equivalent circle diameter of the island portions are more likely to fall within the above ranges than when the thermal decomposition starting temperature is lower than the above range, and the endless belt obtained tends to exhibit better transferability onto a non-smooth paper sheet when used as an intermediate transfer body. Although the reason for this is unclear, the reason may be that the modified dimethyl silicone whose thermal decomposition starting temperature is within the above range is less susceptible to volatilization from the surface than a modified dimethyl silicone whose thermal decomposition starting temperature is lower than the above range even when the modified dimethyl silicone is heated during the process of producing the endless belt. Since the modified dimethyl silicone is less susceptible to volatilization from the surface, the modified dimethyl silicone remains in the endless belt and easily functions as the surface modifier. Moreover, since the modified dimethyl silicone is less susceptible to volatilization from the surface, defects such as blistering on the surface of the endless belt due to volatilization of the modified dimethyl silicone are less likely to occur.

The thermal decomposition starting temperature is measured as follows.

Specifically, a thermal analyzer DTG-60/60H (manufactured by Shimadzu Corporation) is used to heat a 5 mm-diameter measurement sample from room temperature (20° C.) to 350° C. at a heating rate of 10° C./min. Then the rate of reduction in mass before and after the heating is computed, and the temperature at which the rate of reduction in mass reaches 5% by mass is used as the thermal decomposition starting temperature.

When the modified dimethyl silicone is used as the surface modifier, the content of the modified dimethyl silicone is preferably from 1 part by mass to 10 parts by mass inclusive, more preferably from 1.5 parts by mass to 6 parts by mass inclusive, and still more preferably from 1.5 parts by mass to 3 parts by mass inclusive based on 100 parts by mass of the total of the resin and the surface modifier contained in the single layer or the first layer.

When the content of the modified dimethyl silicone is within the above range, the non-electrostatic adhesion of the outer circumferential surface of the endless belt is lower than that when the content is lower than the above range, and the area fraction of the island portions and the average equivalent circle diameter of the island portions are more likely to fall within the above ranges than when the content is higher than the above range.

(Surface Modifier Having Fluorine Atom)

The surface modifier having a fluorine atom is, for example, a compound having a perfluoroalkyl group. From the viewpoint of reducing the non-electrostatic adhesion of the outer circumferential surface of the endless belt, a compound having a perfluoroalkyl group may be used as the surface modifier having a fluorine atom.

When the single layer or the first layer in the endless belt contains the compound having a perfluoroalkyl group as the surface modifier, the outer circumferential surface of the endless belt obtained may exhibit low adhesion. Although the reason for this is unclear, the reason may be that the perfluoroalkyl group reduces the surface free energy to impart water repellency and oil repellency.

Examples of the compound having a perfluoroalkyl group include perfluoroalkene oligomers (such as perfluoropropene oligomers), perfluoroalkyl sulfonic acids (such as perfluorobutane sulfonic acid and perfluorooctane sulfonic acid), perfluoroalkyl carboxylic acids (such as perfluorobutane carboxylic acid and perfluorooctane carboxylic acid), and perfluoroalkyl group-containing phosphates. The perfluoroalkyl sulfonic acids and the perfluoroalkyl carboxylic acids may be their salts and amide-modified products thereof.

Examples of the commercial product of the compound having a perfluoroalkyl group include the MEGAFACE series (manufactured by DIC Corporation), the F-top series (manufactured by JEMCO), the FTERGENT series (manufactured by NEOS Company Limited), the SURFLON series (manufactured by AGC SEIMI CHEMICAL Co., Ltd.), the PF series (manufactured by KITAMURA CHEMICALS CO., LTD.), and the FC series (manufactured by 3M).

The thermal decomposition starting temperature of the compound having a perfluoroalkyl group is preferably 200° C. or higher, more preferably 230° C. or higher, and still more preferably 260° C. or higher. The upper limit of the thermal decomposition starting temperature of the compound having a perfluoroalkyl group is preferably 300° C. or lower, more preferably 280° C. or lower, and still more preferably 270° C. or lower.

When the thermal decomposition starting temperature of the compound having a perfluoroalkyl group is within the above range, the area fraction of the island portions and the average equivalent circle diameter of the island portions are more likely to fall within the above ranges than when the thermal decomposition starting temperature is higher than the above range, and the endless belt obtained may easily exhibit good transferability onto a non-smooth paper sheet when used as an intermediate transfer body. Although the reason for this is unclear, the reason may be that the compound having a perfluoroalkyl group that has a thermal decomposition starting temperature within the above range is more easily dispersed in the resin than a compound having a perfluoroalkyl group that has a thermal decomposition starting temperature higher than the above range.

When the thermal decomposition starting temperature of the compound having a perfluoroalkyl group is within the above range, the area fraction of the island portions and the average equivalent circle diameter of the island portions are more likely to fall within the above ranges than when the thermal decomposition starting temperature is lower than the above range, and the endless belt obtained may easily exhibit good transferability onto a non-smooth paper sheet when used as an intermediate transfer body. Although the reason for this is unclear, the reason may be that the compound having a perfluoroalkyl group that has a thermal decomposition starting temperature within the above range is less susceptible to volatilization from the surface than a compound having a perfluoroalkyl group that has a thermal decomposition starting temperature lower than the above range even when the compound is heated during the process of producing the endless belt. Since the compound having a perfluoroalkyl group is less susceptible to volatilization from the surface, the compound remains in the endless belt and easily functions as the surface modifier. Moreover, since the compound having a perfluoroalkyl group is less susceptible to volatilization from the surface, defects such as blistering on the surface of the endless belt due to volatilization of the compound are less likely to occur.

When the compound having a perfluoroalkyl group is used as the surface modifier, the content of the compound having a perfluoroalkyl group is preferably from 0.5 parts by mass to 10 parts by mass inclusive, more preferably from 3 parts by mass to 9 parts by mass inclusive, and still more preferably from 6 parts by mass to 8 parts by mass inclusive, based on 100 parts by mass of the total of the resin and the surface modifier contained in the single layer or the first layer.

When the content of the compound having a perfluoroalkyl group is within the above range, the non-electrostatic adhesion of the outer circumferential surface of the endless belt is lower than that when the content is lower than the above range, and the area fraction of the island portions and the average equivalent circle diameter of the island portions are more likely to fall within the above ranges than when the content is larger than the above range.

(Surface Modifier Having Alkylene Oxide Structure)

The surface modifier having an alkylene oxide structure is, for example, a copolymer of a polyether and a silicone.

Examples of the copolymer of a polyether and a silicone include a silicone oil in which at least one of the side chains and terminal chains of the polysiloxane chain is modified with polyalkylene oxide.

(Difference in SP from Resin)

The difference between the solubility parameter (hereinafter referred to also as the "SP value") of the resin contained in the single layer or the first layer and the SP value of the surface modifier (the difference may be hereinafter referred to as the "SP difference") is preferably 7 or less and more preferably 5 or less. The SP difference is preferably 3 or more and more preferably 4 or more. The SP difference is preferably from 3 to 7 inclusive, more preferably from 3 to 5 inclusive, and still more preferably from 4 to 5 inclusive.

When the SP difference is within the above range, the transferability of the endless belt is better than that when the SP difference is larger than the above range. Although the reason for this is unclear, the reason may be as follows. It is considered that the SP value of the resin contained in the single layer or the first layer is not largely different from the SP value of a resin used as a raw material of the single layer or the first layer or a precursor of the resin. Therefore, when the SP difference is within the above range, the difference between the SP value of the resin used as the raw material or the precursor of the resin and the SP value of the surface modifier may be small. Since the difference between the SP value of the resin used as the raw material or the precursor of the resin and the SP value of the surface modifier is small, the surface modifier may be easily dispersed in the resin during the process of forming the single layer or the first layer, and this allows the area fraction of the island portions and the average equivalent circle diameter of the island portions to easily fall within the above ranges.

When the SP difference is within the above range, the alignment of the surface modifier on the surface of the resin may be better than that when the SP difference is lower than the above range, so that the endless belt obtained exhibits good transferability.

When two or more resins are contained in the single layer or the first layer, the SP value of the resin whose mass-based content is highest is used as the "SP value of the resins." Similarly, when two or more surface modifiers are contained in the single layer or the first layer, the SP value of the surface modifier whose mass-based content is highest is used as "the SP value of the surface modifiers."

When the resin contained in the single layer or the first layer is a polyimide resin, the SP value of the surface modifier is, for example, in the range of from 7 to 11 inclusive, may be in the range of from 7 to 9 inclusive, and may be in the range of from 8 to 9 inclusive. In another mode, the SP value of the surface modifier when the resin contained in the single layer or the first layer is a polyimide resin may be in the range of from 9 to 11 inclusive.

When the resin contained in the single layer or the first layer is a polyamide-imide resin, the SP value of the surface modifier is, for example, in the range of from 7 to 11 inclusive, may be in the range of from 7 to 9 inclusive, and may be in the range of from 8 to 9 inclusive. In another mode, the SP value of the surface modifier when the resin contained in the single layer or the first layer is a polyamide-imide resin may be in the range of from 9 to 11 inclusive.

When the resin contained in the single layer or the first layer is an aromatic polyether ketone resin, the SP value of the surface modifier is, for example, in the range of from 6 to 10 inclusive and may be in the range of from 6 to 8 inclusive. In another mode, the SP value of the surface modifier when the resin contained in the single layer or the first layer is an aromatic polyether ketone resin may be in the range of from 8 to 11 inclusive.

The solubility parameter is a measure of the compatibility between materials and determined by computing the Hansen's three-dimensional solubility parameter using formula (i) below.

$$\delta=(\delta d^2+\delta p^2+\delta h^2)^{1/2} \quad (i)$$

δ: solubility parameter
δd: term of London dispersion force (van der Waals force) (dispersion term)
δp: term of the polarity of molecules (polarity term)
δh: term of hydrogen bonding (hydrogen bonding term)

The total content of the surface modifier with respect to the total mass of the layer containing the surface modifier is preferably from 0.5% by mass to 10% by mass inclusive, more preferably from 0.7% by mass to 5% by mass inclusive, still more preferably from 1% by mass to 3% by mass inclusive, and particularly preferably from 2% by mass to 3% by mass inclusive, from the viewpoint of improving the transferability of the endless belt.

<Electrically Conductive Particles>

The single layer or the first layer may optionally contain electrically conductive particles. The second layer may optionally contain electrically conductive particles. The electrically conductive particles are, for example, at least one type of particles selected from the group consisting of electrically conductive carbon particles and metal oxide particles. The electrically conductive particles include one type of electrically conductive particles or may be a mixture of two or more types of electrically conductive particles.

The electrically conductive carbon particles are, for example, carbon black particles.

Examples of the carbon black include Ketjen black, oil furnace black, channel black, and acetylene black. The carbon black used may be carbon black with a treated surface (referred to also as "surface-treated carbon black").

The surface-treated carbon black is obtained by adding, for example, carboxy groups, quinone groups, lactone groups, or hydroxy groups to its surface. Examples of the surface treatment method include an air oxidation method in which carbon black is brought into contact with air in a high-temperature atmosphere to react therewith, a method in which carbon black is allowed to react with nitrogen oxide or ozone at room temperature (e.g., 22° C.), and a method in which carbon black is oxidized with air in a high-temperature atmosphere and oxidized with ozone at low temperature.

Examples of the metal oxide particles include tin oxide particles, titanium oxide particles, zinc oxide particles, and zirconium oxide particles.

Other examples of the electrically conductive particles include metal particles (such as aluminum particles and nickel particles) and ionic conductive particles (such as potassium titanate particles and LiCl particles).

When the single layer or the first layer contains the electrically conductive particles, the number average primary particle diameter of the electrically conductive particles contained in the single layer or the first layer is, for example, in the range of 20 nm or less and is preferably in the range of 18 nm or less, more preferably in the range of 15 nm or less, and still more preferably in the range of 13 nm or less, from the viewpoint of ease of adjustment of the amount of discharge. The number average primary particle diameter of the electrically conductive particles contained in the single layer or the first layer is, for example, in the range of 2 nm or more and is preferably in the range of 5 nm or more and more preferably in the range of 8 nm or more, from the viewpoint of ease of adjustment of the amount of discharge.

When the second layer contains the electrically conductive particles, the number average primary particle diameter of the electrically conductive particles contained in the second layer is, for example, in the range of from 2 nm to 40 nm inclusive and is preferably in the range of from 20 nm to 40 nm inclusive, more preferably in the range of from 20 nm to 35 nm inclusive, and still more preferably in the range of from 20 nm to 28 nm inclusive, from the viewpoint of dispersibility of the electrically conductive particles in the endless belt, the mechanical strength of the endless belt, volume resistivity, film formability, etc.

When the endless belt includes the first layer and the second layer, the number average primary particle diameter of the electrically conductive particles contained in the first layer may be smaller than the number average primary particle diameter of the electrically conductive particles contained in the second layer. The number average primary particle diameter of the electrically conductive particles contained in the first layer is preferably equal to or more than 0.5 times and less than 1.0 times the number average primary particle diameter of the electrically conductive particles contained in the second layer, more preferably equal to or more than 0.5 times and equal to or less than 0.8 times, and still more preferably equal to or more than 0.5 times and equal to or less than 0.7 times.

The number average primary particle diameter of the electrically conductive particles is measured by the following method.

First, a measurement sample with a thickness of 100 nm is taken from each layer of the obtained belt using a microtome. The measurement sample is observed under a TEM (transmission electron microscope). The diameters of circles having areas equal to the projected areas of 50 electrically conductive particles (i.e., their equivalent circle diameters) are used as their particle diameters, and their average value is used as the number average primary particle diameter.

The content of the electrically conductive particles with respect to the total mass of the single layer is preferably from 10% by mass to 50% by mass inclusive, more preferably from 13% by mass to 40% by mass inclusive, and still more preferably from 15% by mass to 30% by mass inclusive, from the viewpoint of maintaining the strength of the endless belt etc.

The content of the electrically conductive particles with respect to the total mass of the first layer is preferably from 10% by mass to 50% by mass inclusive, more preferably from 13% by mass to 40% by mass inclusive, and still more preferably from 15% by mass to 30% by mass inclusive, from the viewpoint of maintaining the strength of the endless belt etc.

The content of the electrically conductive particles with respect to the total mass of the second layer is preferably from 5% by mass to 40% by mass inclusive, more preferably from 10% by mass to 30% by mass inclusive, and still more preferably from 20% by mass to 30% by mass inclusive, from the viewpoint of dispersibility of the electrically conductive particles, the mechanical strength of the endless belt, adjustment of the volume resistivity, etc.

<Additional Components>

Each of the single layer, the first layer, and the second layer may contain additional components other than the resin, the surface modifier, and the optional electrically conductive particles.

Examples of the additional components include a conducting material other than the electrically conductive particles, a filler for increasing the strength of the belt, an antioxidant for preventing thermal degradation of the belt, and a heat resistant antioxidant.

When one of the above layers contains any of the additional components, the content thereof with respect to the total mass of the layer is preferably more than 0% by mass and 10% by mass or less, more preferably more than 0% by mass and 5% by mass or less, and still more preferably more than 0% by mass and 1% by mass or less.

<Properties of Endless Belt>
(Thickness of Endless Belt)

The thickness of the single layer is preferably from 60 μm and 120 μm inclusive and more preferably 80 μm and 120 μm inclusive, from the viewpoint of the mechanical strength of the belt.

The thickness of the first layer is preferably from 1 μm to 60 μm inclusive and more preferably from 3 μm to 60 μm inclusive, from the viewpoint of production suitability and from the viewpoint of preventing discharge.

The thickness of the second layer is preferably from 10 μm to 80 μm inclusive and more preferably from 20 μm to 40 μm inclusive, from the viewpoint of the mechanical strength of the belt.

When the endless belt includes the first layer and the second layer, the ratio of the thickness of the first layer to the total thickness of the belt is preferably from 3% to 90% inclusive and more preferably from 5% to 80% inclusive, from the viewpoint of the transferability onto a non-smooth paper sheet.

The thickness of each layer is measured as follows.

Specifically, a cross section of the endless belt in its thickness direction is observed under an optical microscope or a scanning electron microscope. The thickness of the layer of interest is measured at 10 points, and the average value is used as the thickness.

(Volume Resistivity of Endless Belt)

The common logarithm of the volume resistivity of the endless belt when a voltage of 500 V is applied to the endless belt for 10 seconds is preferably from 8.0 (log Ω·cm) to 13.5 (log Ω·cm) inclusive, more preferably from 9.0 (log Ω·cm) to 13.2 (log Ω·cm) inclusive, and particularly preferably from 9.5 (log Ω·cm) to 12.5 (log Ω·cm) inclusive, from the viewpoint of the transferability onto a non-smooth paper sheet.

The volume resistivity of the endless belt when a voltage of 500 V is applied to the endless belt for 10 seconds is measured by the following method.

A microcurrent meter (R8430A manufactured by Advantest) is used as a resistance measurement device, and the probe used is a UR probe (manufactured by Mitsubishi Chemical Analytech Co., Ltd.). The volume resistivity (log Ω·cm) of the endless belt is measured using a voltage of 500 V, an application time of 10 seconds, and a load of 1 kgf at a total of 18 points, i.e., 6 points spaced circumferentially at regular intervals in each of 3 portions including a widthwise central portion and opposite widthwise edge portions, and then the average value is computed. The measurement is performed in an environment at a temperature of 22° C. and a humidity of 55% RH.

(Surface Resistivity of Endless Belt)

The common logarithm of the surface resistivity of the endless belt when a voltage of 500 V is applied to the outer circumferential surface of the endless belt for 10 seconds is preferably from 9.5 (log Ω/sq.) to 15.0 (log Ω/sq.) inclusive, more preferably from 9.5 (log Ω/sq.) to 14.0 (log Ω/sq.) inclusive, and particularly preferably from 10.0 (log Ω/sq.) to 13.5 (log Ω/sq.) inclusive, from the viewpoint of the transferability onto a non-smooth paper sheet.

The unit "log Ω/sq." of the surface resistivity is the logarithm of the resistance value per unit area and is denoted also by log Ω/square, log Ω/□, etc.

The surface resistivity of the endless belt when a voltage of 500 V is applied to the outer circumferential surface of the endless belt for 10 seconds is measured by the following method.

A microcurrent meter (R8430A manufactured by Advantest) is used as a resistance measurement device, and the probe used is a UR probe (manufactured by Mitsubishi Chemical Analytech Co., Ltd.). The surface resistivity (log Ω/sq.) of the outer circumferential surface of the endless belt is measured using a voltage of 500 V, an application time of 10 seconds, and a load of 1 kgf at a total of 18 points, i.e., 6 points spaced circumferentially at regular intervals in each of 3 portions including a widthwise central portion and opposite widthwise edge portions, and then the average value is computed. The measurement is performed in an environment at a temperature of 22° C. and a humidity of 55% RH.

(Adhesion Characteristic)

In the endless belt according to the present exemplary embodiment, when polyester resin particles having a volume average particle diameter of 4.7 μm are caused to adhere to the outer circumferential surface at a load of 0 g/cm$^2$ and then air is blown onto the outer circumferential surface from its upper side while the blowing pressure of the air is increased, the polyester resin particles adhering to the outer circumferential surface are separated therefrom. The blowing pressure at which all the polyester resin particles adhering to the outer circumferential surface are separated therefrom is preferably 6 kPa or less (more preferably 5 kPa or less and still more preferably 3 kPa or less, from the viewpoint of the transferability onto a non-smooth paper sheet). The blowing pressure at which all the polyester resin particles adhering to the outer circumferential surface are separated from the outer circumferential surface is referred to as "particle separation pressure." Specifically, the particle separation pressure of the endless belt according to the present exemplary embodiment is preferably 6 kPa or less, more preferably 5 kPa or less, and still more preferably 3 kPa or less.

When the particle separation pressure is within the above range, non-electrostatic adhesion formed between the outer circumferential surface of the endless belt and a toner is low. In this case, even when a non-smooth paper sheet is used as a recording medium, the occurrence of white patches in an image due to a reduction in transferability is prevented.

As for the combination of the area fraction of the island portions and the particle separation pressure, it is preferable that the area fraction of the island portions is 5% or less and the particle separation pressure is 6 kPa or less.

The combination of the area fraction of the island portions and the particle separation pressure may be such that the area fraction of the island portions is 2.5% or less and the particle separation pressure is from 3 kPa to 6 kPa inclusive, that the area fraction of the island portions is 2.3% or less and the particle separation pressure is from 3 kPa to 5 kPa or less inclusive, that the area fraction of the island portions is 2.3% or less and the particle separation pressure is from 4 kPa to 5 kPa inclusive, and that the area fraction of the island portions is 2.3% or less and the particle separation pressure is from 4 kPa to 4.5 kPa inclusive.

Moreover, the combination of the area fraction of the island portions and the particle separation pressure may be such that the area fraction of the island portions is more than 2.3% and 5% or less and the particle separation pressure is less than 4 kPa, that the area fraction of the island portions is more than 2.3% and 5% or less and the particle separation pressure is less than 3 kPa, that the area fraction of the island portions is more than 2.3% and 5% or less and the particle separation pressure is less than 2.5 kPa, that the area fraction of the island portions is more than 2.3% and 5% or less and the particle separation pressure is 2 kPa or more and less than 2.5 kPa, and that the area fraction of the island portions is from 2.5% to 5% inclusive and the particle separation pressure is 2 kPa or more and less than 2.5 kPa.

As for the combination of the average equivalent circle diameter of the island portions and the particle separation pressure, it is preferable that the average equivalent circle diameter of the island portions is 1.5 µm or less and the particle separation pressure is 6 kPa or less.

The combination of the average equivalent circle diameter of the island portions and the particle separation pressure may be such that the average equivalent circle diameter of the island portions is 0.8 µm or less and the particle separation pressure is from 3 kPa to 6 kPa inclusive, that the average equivalent circle diameter of the island portions is 0.6 µm or less and the particle separation pressure is from 3 kPa to 5 kPa inclusive, that the average equivalent circle diameter of the island portions is 0.6 µm or less and the particle separation pressure is from 4 kPa to 5 kPa inclusive, and that the average equivalent circle diameter of the island portions is 0.6 µm or less and the particle separation pressure is from 4 kPa to 4.5 kPa inclusive.

Moreover, the combination of the average equivalent circle diameter of the island portions and the particle separation pressure may be such that the average equivalent circle diameter of the island portions is more than 0.6 µm and 1.5 µm or less and the particle separation pressure is less than 4 kPa, that the average equivalent circle diameter of the island portions is more than 0.6 µm and 1.5 µm or less and the particle separation pressure is less than 3 kPa, that the average equivalent circle diameter of the island portions is more than 0.6 µm and 1.5 µm or less and the particle separation pressure is less than 2.5 kPa, that the average equivalent circle diameter of the island portions is more than 0.6 µm and 1.5 µm or less and the particle separation pressure is 2 kPa or more and less than 2.5 kPa, and that the average equivalent circle diameter of the island portions is from 0.7 µm to 1.5 µm inclusive and the particle separation pressure is 2 kPa or more and less than 2.5 kPa.

The particle separation pressure is measured as follows.

First, a 3 cm×4 cm rectangular test specimen is cut from the endless belt of interest.

Next, with a voltage of 10 kV applied horizontally to the surface of the specimen that corresponds to the outer circumferential surface of the endless belt in an environment of 22° C. and 15%, the polyester resin particles are sprayed downward onto the surface of the specimen corresponding to the outer circumferential surface of the endless belt from a height of 15 cm to cause the polyester resin particles to adhere to the surface at a mass per unit area of 3 g/cm². The polyester resin particles are sprayed downward so as to free fall by their own weight from a height of 10 cm or less measured from the surface corresponding to the outer circumferential surface of the endless belt and allowed to adhere to the surface corresponding to the outer circumferential surface of the endless belt at a load of 0 g/cm².

The polyester resin particles are formed of a polycondensation product of dimethyl fumarate that is a dicarboxylic acid and propylene glycol that is a dialcohol, and the resin particles used have a weight average molecular weight of 25000 and a volume average particle diameter of 4.7 µm.

The polyester resin particles used are resin particles that are not substantially in frictional contact with each other or other members (such as a carrier) and cause substantially no triboelectrification. Specifically, the polyester resin particles used are resin particles that have been stored in an environment of from 10° C. to 22° C. inclusive and from 10% RH to 55% RH inclusive for a half year after the production.

Next, air is blown onto a central portion of the polyester resin particle-adhering surface of the specimen from an air blowing port having a diameter of 0.7 mm and located at a height of 3 cm from the surface of the specimen. The blowing of the air is started using a blowing pressure of 0.1 kPa, and the blowing pressure is increased at 0.5 kPa/second.

The blowing pressure at which all the polyester resin particles are separated from the specimen is used as the "particle separation pressure."

The weight average molecular weight of the polyester resin particles is measured by gel permeation chromatography (GPC). In the molecular weight measurement by GPC, a GPC measurement apparatus HLC-8120GPC manufactured by TOSOH Corporation is used. A TSKgel Super HM-M (15 cm) column manufactured by TOSOH Corporation and a THF solvent are used. The weight average molecular weight and the number average molecular weight are computed from the measurement results using a molecular weight calibration curve produced using monodispersed polystyrene standard samples.

The volume average particle diameter of the polyester resin particles is measured using Coulter Multisizer II (manufactured by Beckman Coulter, Inc.), and ISOTON-II (manufactured by Beckman Coulter, Inc.) is used as an electrolyte.

In the measurement, a measurement sample in an amount of from 0.5 mg to 50 mg inclusive is added to 2 mL of a 5% aqueous solution of a surface modifier (which may be sodium alkylbenzenesulfonate) serving as a dispersant. The mixture is added to 100 mL to 150 mL of the electrolyte.

The electrolyte with the sample suspended therein is subjected to dispersion treatment for 1 minute using an ultrasonic dispersion apparatus, and then the particle size distribution of particles having diameters within the range of from 2 μm to 60 μm inclusive is measured using an aperture having an aperture diameter of 100 μm in the Coulter Multisizer II. The number of particles sampled is 50000.

The particle size distribution measured and divided into particle size ranges (channels) is used to obtain a volumetric cumulative distribution computed from the small diameter side, and the particle diameter at a cumulative frequency of 50% is defined as the volume average particle diameter D50v.

<Method for Producing Endless Belt>

No particular limitation is imposed on the method for producing the endless belt according to the present exemplary embodiment.

An example of the method for producing the endless belt includes: a first coating solution preparing step of preparing the first coating solution containing the first resin or its precursor, the surface modifier, the optionally used electrically conductive particles, and a first solvent; a first coating film forming step of forming a first coating film by applying the first coating solution to the outer circumference surface of a substrate to be coated; and a first drying step of drying the first coating film while the temperature of the coated substrate is increased. The method for producing the endless belt may further include an additional step in addition to the first coating solution preparing step, the first coating film forming step, and the first drying step. Examples of the additional step when, for example, a precursor of the first resin is used include a first firing step of firing the first coating film dried in the first drying step.

When a single-layer endless belt is produced, the first coating solution preparing step, the first coating film forming step, and the first drying step are performed, and the single layer containing the first resin, the surface modifier, and the optionally used electrically conductive particles is thereby formed on the outer circumferential surface of the substrate. The single layer may be formed, for example, by preparing pellets containing the first resin, the surface modifier, and the optionally used electrically conductive particles and subjecting the pellets to melt extrusion.

When a layered endless belt is produced, the first coating solution preparing step, the first coating film forming step, and the first drying step, for example, are performed, and the first layer containing the first resin, the surface modifier, and the optionally used electrically conductive particles is thereby formed on the outer circumferential surface of the second layer formed on a substrate.

When the layered endless belt is produced, the second layer is formed on the outer circumferential surface of the substrate through, for example; a second coating solution preparing step of preparing a second coating solution containing the second resin or a precursor thereof, the optionally used electrically conductive particles, and a second solvent; a second coating film forming step of forming a second coating film by applying the second coating solution to the outer circumferential surface of the substrate; and a second drying step of drying the second coating film. The second layer may be formed, for example, by preparing pellets containing the second resin and the optionally used electrically conductive particles and subjecting the pellets to melt extrusion.

(Coating Solution Preparing Steps)

In the first coating solution preparing step, the first coating solution containing the first resin or a precursor thereof, the surface modifier, the optionally used electrically conductive particles, and the first solvent is prepared. For example, when the first resin is a polyimide resin and the optionally used electrically conductive particles are carbon black particles, the first coating solution prepared is, for example, a solution that contains the carbon black particles dispersed in the first solvent and a polyamic acid used as the precursor of the polyimide resin and dissolved in the first solvent. Alternatively, for example, when the first resin is a polyamide-imide resin and the optionally used electrically conductive particles are carbon black particles, the first coating solution prepared is, for example, a solution that contains the carbon black particles dispersed in the first solvent and the polyamide-imide resin dissolved in the first solvent.

In a method for preparing the first coating solution, dispersion treatment may be performed using a mill such as a ball mill or a jet mill, from the viewpoint of increasing the dispersibility of the optionally used electrically conductive particles.

No particular limitation is imposed on the first solvent, and the first solvent may be appropriately selected according to, for example, the type of resin used as the first resin. For example, when the first resin is a polyimide resin or a polyamide-imide resin, the first solvent used may be a polar solvent.

Examples of the polar solvent include N-methyl-2-pyrrolidone (NMP), N,N-dimethylformamide (DMF), N,N-dimethylacetamide (DMAc), N,N-diethylacetamide (DEAc), dimethyl sulfoxide (DMSO), hexamethylenephosphoramide (HMPA), N-methylcaprolactam, N-acetyl-2-pyrrolidone, and 1,3-dimethyl-2-imidazolidinone (N,N-dimethylimidazolidinone, DMI), and any of them may be used alone or in combination of two or more.

When the second coating solution preparing step is performed, the second coating solution containing the second resin, the optionally used electrically conductive particles, and the second solvent is prepared in the second coating solution preparing step. The second resin and the optionally used electrically conductive particles are as described above, and a method for preparing the second coating solution and the second solvent are the same as the method for preparing the first coating solution and the first solvent, respectively.

(Coating Film Forming Steps)

In the first coating film forming step, the first coating solution is applied to the outer circumferential surface of a substrate to be coated to form the first coating film.

Examples of the substrate to be coated include hollow cylindrical molds and solid cylindrical molds. The substrate to be coated may be prepared by subjecting the outer circumferential surface of any of the above molds to release agent treatment. When a single-layer endless belt is produced, the first coating solution is directly applied to, for example, the outer circumferential surface of the substrate to be coated or the substrate treated with the release agent in the first coating film forming step. When a layered endless belt is produced, the first coating solution is applied to, for example, the outer circumferential surface of a substrate having the second layer or the second coating film formed thereon in the first coating film forming step.

Examples of the method for applying the first coating solution include known methods such as a spray coating method, a spiral coating (flow coating) method, a blade coating method, a wire bar coating method, a dip coating method, a bead coating method, an air knife coating method, and a curtain coating method.

When the second coating film forming step is performed, the second coating solution is applied to the outer circumferential surface of a substrate to be coated in the second coating film forming step to form the second coating film. The method for applying the second coating solution is the same as the method for applying the first coating solution.

(Drying Steps)

In the first drying step, the first coating film formed in the first coating film forming step is dried. In the first drying step, the first solvent contained in the first coating film is removed, and the single layer or the first layer is thereby obtained.

Examples of the method for drying the first coating film include a method in which hot air is supplied to the first coating film and a method in which the coated substrate is heated.

The drying temperature in the first drying step is preferably in the range of from 100° C. to 200° C. inclusive, more preferably in the range of from 105° C. to 170° C. inclusive, still more preferably in the range of from 110° C. to 135° C. inclusive, and particularly preferably in the range of from 110° C. to 120° C. inclusive.

When the drying temperature is in the above range, the area fraction of the island portions and the average equivalent circle diameter of the island portions in the endless belt obtained are more likely to fall within the above ranges than when the drying temperature is higher than the above range. Although the reason for this is unclear, this may be because of the following reason. When the drying temperature is low, the migration rate of the solvent in the layer and the volatilization rate of the solvent from the surface are low, and aggregation of the surface modifier due to migration of the surface modifier together with the solvent is reduced. In particular, when the SP value of the first solvent is close to the SP value of the surface modifier than the SP value of the resin, the aggregation of the surface modifier due to migration of the surface modifier together with the solvent is more likely to occur. However, when the drying temperature is low, the migration and aggregation of the surface modifier may be reduced.

When the drying temperature is in the above range, the dispersion state of the surface modifier is better than that when the drying temperature is lower than the above range.

The drying time in the first drying step is preferably in the range of from 3 minutes to 90 minutes inclusive, more preferably in the range of from 10 minutes to 90 minutes inclusive, and still more preferably in the range of from 30 minutes to 70 minutes inclusive.

When the drying temperature is low and the drying time is long, the area fraction of the island portions and the average equivalent circle diameter of the island portions in the endless belt obtained are more likely to fall within the above ranges.

When the first drying step is the step of supplying hot air to the first coating film, the drying temperature is the temperature of the hot air supplied to the first coating film, and the drying time is the time during which the hot air is supplied to the first coating film.

The temperature of the hot air at the surface of the first coating film is measured using a thermometer (for example, K thermocouple type JBS-7115-5M-K manufactured by GRAPHTEC Corporation) connected to a data recorder type GL240 manufactured by GRAPHTEC Corporation.

No particular limitation is imposed on the method for supplying the hot air to the surface of the first coating film, and examples thereof include a method in which hot air from a drying furnace is blown from a slit nozzle onto the surface of the first coating film and a method in which the hot air from the drying furnace is supplied directly to the first coating film. Of these, the method using the slit nozzle may be used from the viewpoint of ease of controlling the velocity of the hot air at the surface of the first coating film.

The velocity of the hot air at the surface of the first coating film is, for example, in the range of from 0.1 m/s to 50 m/s inclusive, preferably in the range of from 1 m/s to 40 m/s inclusive, and more preferably in the range of from 1 m/s to 20 m/s inclusive.

The velocity of the hot air at the surface of the first coating film is measured as follows. Specifically, an anemometer (TM350 manufactured by TASCO) is used, and its probe is disposed on the surface of the coating film to measure the velocity.

When the second drying step is performed, the second coating film formed in the second coating film forming step is dried in the second drying step. The method for drying the second coating film is the same as the method for drying the first coating film. The second drying step may be completed before the first coating film forming step is performed. The first coating film forming step may be performed before completion of the second drying step, and the first drying step may serve as part of the second drying step.

(Firing Steps)

As described above, in the method for producing the endless belt, the first firing step may be performed. In the first firing step, the first coating film dried in the first drying step is heated and fired. When, for example, the first resin is a polyimide resin, the polyamic acid contained in the first coating film is imidized in the first firing step, and the polyimide is thereby obtained.

The heating temperature in the first firing step is, for example, in the range of from 150° C. to 450° C. inclusive and preferably in the range of from 200° C. to 430° C. inclusive. The heating time in the first firing step is, for example, in the range of from 20 minutes to 180 minutes inclusive and preferably in the range of from 60 minutes to 150 minutes inclusive.

When the second layer is formed through the second coating solution preparing step, the second coating film forming step, and the second drying step in the course of production of the layered endless belt, a second firing step of firing the second coating film dried in the second drying step may be performed. The second firing step may serve also as the first firing step.

[Transfer Device]

A transfer device according to an exemplary embodiment includes: an intermediate transfer body having an outer circumferential surface onto which a toner image is to be transferred; a first transfer unit including a first transfer member that first-transfers the toner image formed on the surface of an image holding member onto the outer circumferential surface of the intermediate transfer body; and a second transfer unit including a second transfer member that is disposed in contact with the outer circumferential surface of the intermediate transfer body and second-transfers the toner image transferred onto the outer circumferential surface of the intermediate transfer body onto a surface of a recording medium. The endless belt according to the preceding exemplary embodiment is used as the intermediate transfer body.

In the first transfer unit, the first transfer member is disposed so as to face the image holding member with the intermediate transfer body therebetween. In the first transfer unit, the first transfer member is used to apply a voltage whose polarity is opposite to the charge polarity of the toner to the intermediate transfer body, and the toner image is thereby first-transferred onto the outer circumferential surface of the intermediate transfer body.

In the second transfer unit, the second transfer member is disposed on the toner image holding side of the intermediate transfer body. The second transfer unit further includes, in addition to the second transfer member, a back member disposed on the side opposite to the toner image holding side of the intermediate transfer body. In the second transfer unit, the intermediate transfer body and a recording medium are sandwiched between the second transfer member and the back member, and a transfer electric field is formed to second-transfer the toner image on the intermediate transfer body onto the recording medium.

The second transfer member may be a second transfer roller or may be a second transfer belt. The back member used is, for example, a back roller.

The transfer device according to the present exemplary embodiment may be a transfer device that transfers a toner image onto the surface of a recording medium through a plurality of intermediate transfer bodies. Specifically, the transfer device may be, for example, as follows. A toner image is first-transferred from the image holding member onto a first intermediate transfer body, and the toner image is second-transferred from the first intermediate transfer body onto a second intermediate transfer body. Then the toner image is third-transferred from the second intermediate transfer body onto a recording medium.

When the transfer device includes a plurality of intermediate transfer bodies, the endless belt according to the preceding exemplary embodiment is applied to at least the intermediate transfer body that transfers a toner image onto a recording medium.

[Image Forming Apparatus]

An image forming apparatus according to an exemplary embodiment includes: a toner image forming device that forms a toner image on a surface of an image holding member; and a transfer device that transfers the toner image formed on the surface of the image holding member onto a surface of a recording medium. The transfer device according to the preceding exemplary embodiment is applied to the above transfer device.

The toner image forming device is, for example, a device including: the image holding member; a charging unit for charging the surface of the image holding member; an electrostatic latent image forming unit that forms an electrostatic latent image on the charged surface of the image holding member; and a developing unit that develops the electrostatic latent image formed on the surface of the image holding member using a developer containing a toner to thereby form a toner image.

The image forming apparatus according to the present exemplary embodiment is applied to well-known image forming apparatuses such as: an apparatus including fixing means for fixing a toner image transferred onto a surface of a recording medium; an apparatus including cleaning means for cleaning the surface of the image holding member after transfer of a toner image but before charging; an apparatus including charge eliminating means for eliminating charges on the surface of the image holding member after transfer of a toner image but before charging by irradiating the surface of the image holding member with charge elimination light; and an apparatus including an image holding member-heating member for increasing the temperature of the image holding member to reduce relative temperature.

The image forming apparatus according to the present exemplary embodiment may be an image forming apparatus of a dry development type or an image forming apparatus of a wet development type (a development type using a liquid developer).

In the image forming apparatus according to the present exemplary embodiment, for example, a portion including the image holding member may have a cartridge structure that is detachable from the image forming apparatus (this portion may be a process cartridge). The process cartridge used may include a toner image forming device and a transfer device.

An example of the image forming apparatus according to the present exemplary embodiment will be described with reference to the drawings. However, the image forming apparatus according to the present exemplary embodiment is not limited thereto. In the following description, major components shown in the drawings will be described, and description of other components will be omitted.

(Image Forming Apparatus)

FIG. 1 is a schematic illustration showing the structure of the image forming apparatus according to the present exemplary embodiment.

As shown in FIG. 1, the image forming apparatus 100 according to the present exemplary embodiment is, for example, an intermediate transfer type image forming apparatus having a so-called tandem configuration and includes: a plurality of image forming units 1Y, 1M, 1C, and 1K (examples of the toner image forming device) that form toner images of respective colors by an electrophotographic process; first transfer units 10 that transfer (first-transfer) the color toner images formed by the image forming units 1Y, 1M, 1C, and 1K sequentially onto an intermediate transfer belt 15; a second transfer unit 20 that transfers (second-transfers) all the superposed toner images transferred onto the intermediate transfer belt 15 at once onto a paper sheet K used as a recording medium; and a fixing device 60 that fixes the second-transferred images onto the paper sheet K. The image forming apparatus 100 further includes a controller 40 that controls the operation of each device (each unit).

Each of the image forming units 1Y, 1M, 1C, and 1K of the image forming apparatus 100 includes a photoreceptor 11 (an example of the image holding member) that rotates in the direction of an arrow A and holds a toner image formed on its surface.

A charging unit 12 that charges the photoreceptor 11 and serves as an example of the charging unit is disposed near the circumference of the photoreceptor 11. A laser exposure unit 13 serving as an example of the electrostatic latent image forming unit and used to write an electrostatic latent image on the photoreceptor 11 is disposed above the photoreceptor 11 (in FIG. 1, an exposure beam is denoted by symbol Bm).

A developing unit 14 that serves as an example of the developing unit, contains a color toner, and visualizes the electrostatic latent image on the photoreceptor 11 with the toner is disposed near the circumference of the photoreceptor 11, and a first transfer roller 16 is provided, which transfers the color toner image formed on the photoreceptor 11 onto the intermediate transfer belt 15 in a corresponding first transfer unit 10.

A photoreceptor cleaner 17 that removes the toner remaining on the photoreceptor 11 is disposed near the circumference of the photoreceptor 11. These electrophotographic devices including the charging unit 12, the laser exposure unit 13, the developing unit 14, the first transfer roller 16, and the photoreceptor cleaner 17 are sequentially arranged in the rotation direction of the photoreceptor 11. The image forming units 1Y, 1M, 1C, and 1K are arranged substantially linearly in the order of yellow (Y), magenta (M), cyan (C), and black (K) from the upstream side of the intermediate transfer belt 15.

The intermediate transfer belt 15 is circulated (rotated) by various rollers in a direction B shown in FIG. 1 at a speed appropriate for its intended use. These rollers include: a driving roller 31 driven by a motor (not shown) excellent in constant speed property to rotate the intermediate transfer belt 15; a support roller 32 that supports the intermediate transfer belt 15 extending substantially linearly in the arrangement direction of the photoreceptors 11; a tension applying roller 33 that applies tension to the intermediate transfer belt 15 and serves as a correction roller for preventing meandering of the intermediate transfer belt 15; a back roller 25 disposed in the second transfer unit 20; and a cleaning back roller 34 disposed in a cleaning unit in which toner remaining on the intermediate transfer belt 15 is scraped off.

Each first transfer unit 10 includes a corresponding first transfer roller 16 facing a corresponding photoreceptor 11 with the intermediate transfer belt 15 therebetween. The first transfer roller 16 is disposed so as to be pressed against the photoreceptor 11 with the intermediate transfer belt 15 therebetween, and a voltage (first transfer bias) whose polarity is opposite to the charge polarity of the toner (negative polarity, the same applies to the following) is applied to the first transfer roller 16. Therefore, the toner images on the photoreceptors 11 are electrostatically attracted to the intermediate transfer belt 15 in a sequential manner, and the toner images are superposed on the intermediate transfer belt 15.

The second transfer unit 20 includes the back roller 25 and a second transfer roller 22 disposed on the toner image holding surface side of the intermediate transfer belt 15.

The back roller 25 is formed such that its surface resistivity is from $1\times10^7 \Omega/\square$ to $1\times10^{10} \Omega/\square$ inclusive, and its hardness is set to, for example, 70° (ASKER C manufactured by Kobunshi Keiki Co., Ltd., the same applies to the following). The back roller 25 is disposed on the back side of the intermediate transfer belt 15 and forms a counter electrode of the second transfer roller 22, and a metallic feeding roller 26 to which a second transfer bias is stably applied is disposed in contact with the back roller 25.

The second transfer roller 22 is a cylindrical roller having a volume resistivity of from $10^{7.5}$ Ω·cm to $10^{8.5}$ Ω·cm inclusive. The second transfer roller 22 is disposed so as to be pressed against the back roller 25 with the intermediate transfer belt 15 therebetween. The second transfer roller 22 is grounded, and the second transfer bias is formed between the second transfer roller 22 and the back roller 25. The toner images are second-transferred onto a paper sheet K conveyed to the second transfer unit 20.

An intermediate transfer belt cleaning member 35 is disposed downstream of the second transfer unit 20 so as to be separable from the intermediate transfer belt 15. The intermediate transfer belt cleaning member 35 removes toner and paper powder remaining on the intermediate transfer belt 15 after second transfer to thereby clean the outer circumferential surface of the intermediate transfer belt 15.

A second transfer roller cleaning member 22A is disposed downstream of the second transfer roller 22 of the second transfer unit 20. The second transfer roller cleaning member 22A removes toner and paper powder remaining on the second transfer roller 22 after second transfer to thereby clean the outer circumferential surface of the intermediate transfer belt 15. Examples of the second transfer roller cleaning member 22A include a cleaning blade. A cleaning roller may also be used.

The intermediate transfer belt 15, the first transfer rollers 16, and the second transfer roller 22 correspond to an example of the transfer device.

Figure 2:
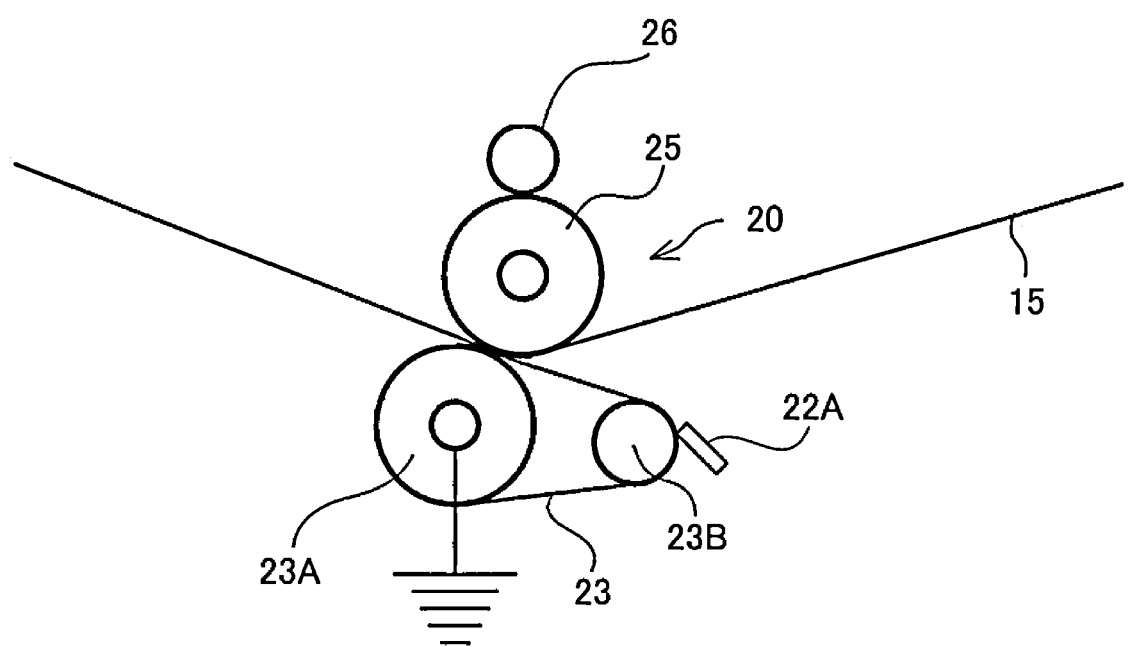
FIG. 2 is a schematic illustration showing the periphery of a second transfer unit in another example of the image forming apparatus according to the exemplary embodiment.

The image forming apparatus 100 may include a second transfer belt (an example of the second transfer member) instead of the second transfer roller 22. Specifically, as shown in FIG. 2, the image forming apparatus 100 may include a second transfer unit including a second transfer belt 23, a driving roller 23A disposed so as to face the back roller 25 with the intermediate transfer belt 15 and the second transfer belt 23 interposed therebetween, and an idler roller 23B that, together with the driving roller 23A, supports the second transfer belt 23 under tension.

A reference sensor (home position sensor) 42 that generates a reference signal used as a reference for image formation timings in the image forming units 1Y, 1M, 1C, and 1K is disposed upstream of the yellow image forming unit 1Y. An image density sensor 43 for image quality adjustment is disposed downstream of the black image forming unit 1K. When the reference sensor 42 detects a mark provided on the back side of the intermediate transfer belt 15, the reference sensor 42 generates the reference signal. The controller 40 issues instructions in response to the reference signal to start image formation in the image forming units 1Y, 1M, 1C, and 1K.

The image forming apparatus according to the present exemplary embodiment further includes, as conveyer means for conveying a paper sheet K: a paper sheet container 50 that houses paper sheets K; a paper feed roller 51 that picks up and conveys the paper sheets K stacked in the paper sheet container 50 one by one at predetermined timing; conveyer rollers 52 that convey each paper sheet K fed by the paper feed roller 51; a conveying guide 53 that feeds the paper sheet K conveyed by the conveyer rollers 52 to the second transfer unit 20; a conveyer belt 55 that conveys, to the fixing device 60, the paper sheet K conveyed by the second transfer roller 22 after second transfer; and a fixation entrance guide 56 that guides the paper sheet K to the fixing device 60.

Next, a basic image forming process of the image forming apparatus according to the present exemplary embodiment will be described.

In the image forming apparatus according to the present exemplary embodiment, image data outputted from, for example, an unillustrated image reading device or an unillustrated personal computer (PC) is subjected to image processing in an unillustrated image processing device, and image forming operations are performed in the image forming units 1Y, 1M, 1C, and 1K.

In the image processing device, the inputted reflectance data is subjected to various types of image processing such as shading compensation, misregistration correction, lightness/color space transformation, gamma correction, frame erasure, and various types of image editing such as color editing and move editing. The image data subjected to the image processing is converted to four types of color tone data including Y color data, M color data, C color data, and K color data, and they are outputted to the respective laser exposure units 13.

In each of the laser exposure units 13, the photoreceptor 11 of a corresponding one of the image forming units 1Y, 1M, 1C, and 1K is irradiated with an exposure beam Bm emitted from, for example, a semiconductor laser according to the inputted color tone data. In each of the image forming units 1Y, 1M, 1C, and 1K, the surface of the photoreceptor 11 is charged by the charging unit 12 and is then scanned and exposed using the laser exposure unit 13, and an electrostatic latent image is thereby formed. The electrostatic latent images formed are developed in the respective image forming units 1Y, 1M, 1C, and 1K to thereby form Y, M, C, and K color images.

The toner images formed on the photoreceptors 11 of the image forming units 1Y, 1M, 1C, and 1K are transferred onto the intermediate transfer belt 15 in the first transfer units 10 in which the photoreceptors 11 come into contact with the intermediate transfer belt 15. More specifically, in each of the first transfer units 10, a voltage (first transfer bias) whose polarity is opposite to the charge polarity (negative polarity) of the toner is applied by the first transfer roller 16 to the base of the intermediate transfer belt 15. The toner images are thereby sequentially superposed onto the outer circumferential surface of the intermediate transfer belt 15, and the first transfer is completed.

After the toner images have been sequentially first-transferred onto the outer circumferential surface of the intermediate transfer belt 15, the intermediate transfer belt 15 moves, and the toner images are conveyed toward the second transfer unit 20. When the toner images are conveyed toward the second transfer unit 20, the paper feed roller 51 in the conveyer means starts rotating at the timing of conveyance of the toner images to the second transfer unit 20 to feed a paper sheet K of the intended size from the paper sheet container 50. The paper sheet K fed by the paper feed roller 51 is conveyed by the conveyer rollers 52 and reaches the second transfer unit 20 through the transfer guide 53. Before the paper sheet K reaches the second transfer unit 20, the paper sheet K is temporarily stopped. Then a registration roller (not shown) starts rotating at an appropriate timing determined by the movement of the intermediate transfer belt 15 with the toner images held thereon, and the position of the paper sheet K is thereby aligned with the position of the toner images.

In the second transfer unit 20, the second transfer roller 22 is pressed against the back roller 25 through the intermediate transfer belt 15 therebetween. In this case, the paper sheet K conveyed at the appropriate timing is pinched between the intermediate transfer belt 15 and the second transfer roller 22. Then, when a voltage (second transfer bias) whose polarity is the same as the charge polarity (negative polarity) of the toner is applied from the feeding roller 26, a transfer electric field is formed between the second transfer roller 22 and the back roller 25. All the unfixed toner images held on the intermediate transfer belt 15 are thereby electrostatically transferred at once onto the paper sheet K in the second transfer unit 20 in which the intermediate transfer belt 15 is pressed by the second transfer roller 22 and the back roller 25.

Then the paper sheet K with the toner images electrostatically transferred thereon is released from the intermediate transfer belt 15 and conveyed by the second transfer roller 22 to the conveyer belt 55 disposed downstream, with respect to the conveyance direction of the paper sheet, of the second transfer roller 22. The conveyer belt 55 conveys the paper sheet K to the fixing device 60 at an optimal conveyance speed for the fixing device 60. The unfixed toner images on the paper sheet K conveyed to the fixing device 60 are subjected to fixation processing using heat and pressure by the fixing device 60 and thereby fixed onto the paper sheet K. The paper sheet K with the fixed image formed thereon is conveyed to an output sheet container (not shown) disposed in an output unit of the image forming apparatus.

After completion of transfer onto the paper sheet K, the toner remaining on the intermediate transfer belt 15 is conveyed to the cleaning unit by the rotation of the intermediate transfer belt 15 and is removed from the intermediate transfer belt 15 by the cleaning back roller 34 and the intermediate transfer belt cleaning member 35.

Although the exemplary embodiments have been described, the present disclosure is not to be construed as being limited to the exemplary embodiments, and various modifications, changes, and improvements are possible.

EXAMPLES

Examples of the present disclosure will be described, but the present disclosure is not limited to the following Examples. In the following description, "parts" and "%" are based on mass, unless otherwise specified.

Example A1

[Production of Belt A1]
—Preparation of coating solution A1—

Carbon black particles and a surface modifier are added to an N-methyl-2-pyrrolidone (NMP) solution of a polyamic acid including a unit derived from 3,3',4,4'-biphenyltetracarboxylic dianhydride and a unit derived from 4,4'-diaminodiphenyl ether (solid content after imidization: 18% by mass) such that the amount of the carbon black particles added and the amount of the surface modifier with respect to 100 parts by mass of the total of the mass of the polyamic acid dissolved in the solution and the mass of solids after imidization are as described below. These components are dispersed, mixed, and stirred to thereby obtain a coating solution A1.

- Carbon black particles [Color Black FW200 manufactured by Orion Engineered Carbons, gas black (i.e., channel black), number average primary particle diameter: 13 nm, pH: 3.0 (hereinafter abbreviated as "FW200")] 18 parts by mass
- Surface modifier [product name: KP126 manufactured by Shin-Etsu Chemical Co., Ltd., type: polyether-modified dimethyl silicone, SP value: 8.6, thermal decomposition starting temperature: 264° C.] An amount giving a content shown in Table 1 ("Content" in Table 1) based on 100 parts by mass of the total of the resin and the surface modifier contained in a layer to be formed.

An aluminum-made cylindrical body having an outer diameter of 366 mm and a length of 600 mm is prepared.

The coating solution A1 is discharged onto the outer surface of the aluminum-made cylindrical body at a thickness of 80 μm and a width of 500 mm through a dispenser while the aluminum-made cylindrical body is rotated. With the cylindrical forming tube held horizontal, the coating solution A1 is subjected to heat drying treatment at 110° C. in an air atmosphere for 67 minutes (a drying step) and then fired for 120 minutes at a maximum temperature of 320° C. to thereby obtain an endless belt A1.

The endless belt A1 is removed from the mold. A holder is used to support the removed endless belt A1 under tension, and the endless belt A1 is cut using a cutter with an adjusted insertion angle to obtain an annular member with a diameter φ of 366 mm, a width of 369 mm, and a thickness of 80 μm. The thus-produced endless belt is used as a belt A1.

The volume resistivity of the belt A1 and the surface resistivity of its outer circumferential surface are measured using the above-described methods. The common logarithm of the volume resistivity is 9.6 (log Ω·cm), and the common logarithm of the surface resistivity is 10.0 (log Ω/sq.).

The difference between the SP value of the resin contained in the belt A1 and the SP value of the surface modifier (i.e., the SP difference) is shown in Table 1.

Example A2

<Production of Belt A2>

An endless belt A2 is obtained in the same manner as that for the endless belt A1 except that, in the drying step for the belt A1, the drying treatment is performed at 140° C. in an air atmosphere for 30 minutes instead of at 110° C. in an air atmosphere for 67 minutes.

The endless belt A2 is cut in the same manner as that for the endless belt A1 to obtain an annular member with a diameter φ of 366 mm, a width of 369 mm, and a thickness of 80 μm. The thus-obtained endless belt is used as a belt A2.

The volume resistivity of the belt A2 and the surface resistivity of its outer circumferential surface are measured using the above-described methods. The common logarithm of the volume resistivity is 9.8 (log Ω·cm), and the common logarithm of the surface resistivity is 10.2 (log Ω/sq.).

Example A3

<Production of Belt A3>

An endless belt A3 is obtained in the same manner as that for the endless belt A1 except that, in the drying step for the belt A1, the drying treatment is performed at 170° C. in an air atmosphere for 13 minutes instead of at 110° C. in an air atmosphere for 67 minutes.

The endless belt A3 is cut in the same manner as that for the endless belt A1 to obtain an annular member with a diameter φ of 366 mm, a width of 369 mm, and a thickness of 80 μm. The thus-obtained endless belt is used as a belt A3.

The volume resistivity of the belt A3 and the surface resistivity of its outer circumferential surface are measured using the above-described methods. The common logarithm of the volume resistivity is 9.9 (log Ω·cm), and the common logarithm of the surface resistivity is 10.3 (log Ω/sq.).

Example A4

<Production of Belt A4>

An endless belt A4 is obtained in the same manner as that for the endless belt A1 except that the surface modifier (product name: KP126) used for the coating solution A1 is added in such an amount that its content based on 100 parts by mass of the total of the resin and the surface modifier contained in the layer formed is an amount shown in Table 1 ("Content" in Table 1).

The endless belt A4 is cut in the same manner as that for the endless belt A1 to obtain an annular member with a diameter φ of 366 mm, a width of 369 mm, and a thickness of 80 μm. The thus-obtained endless belt is used as a belt A4.

The volume resistivity of the belt A4 and the surface resistivity of its outer circumferential surface are measured using the above-described methods. The common logarithm of the volume resistivity is 9.8 (log Ω·cm), and the common logarithm of the surface resistivity is 10.2 (log Ω/sq.).

Example A5

<Production of Belt A5>

An endless belt A5 is obtained in the same manner as that for the endless belt A1 except that the surface modifier (product name: KP126) used for the coating solution A1 is added in such an amount that its content based on 100 parts by mass of the total of the resin and the surface modifier contained in the layer formed is an amount shown in Table 1 ("Content" in Table 1).

The endless belt A5 is cut in the same manner as that for the endless belt A1 to obtain an annular member with a diameter φ of 366 mm, a width of 369 mm, and a thickness of 80 μm. The thus-obtained endless belt is used as a belt A5.

The volume resistivity of the belt A5 and the surface resistivity of its outer circumferential surface are measured using the above-described methods. The common logarithm of the volume resistivity is 8.3 (log Ω·cm), and the common logarithm of the surface resistivity is 9.7 (log Ω/sq.).

Example A6

<Production of Belt A6>

An endless belt A6 is obtained in the same manner as that for the endless belt A1 except that the surface modifier used for the coating solution A1 is changed to a different surface modifier (product name: KP101 manufactured by Shin-Etsu Chemical Co., Ltd., type: polyether-modified dimethyl silicone, SP value: 8.7, thermal decomposition starting temperature: 266° C.) and that the surface modifier is added in such an amount that its content based on 100 parts by mass of the total of the resin and the surface modifier contained in the layer formed is an amount shown in Table 1 ("Content" in Table 1).

The endless belt A6 is cut in the same manner as that for the endless belt A1 to obtain an annular member with a diameter φ of 366 mm, a width of 369 mm, and a thickness of 80 μm. The thus-obtained endless belt is used as a belt A6.

The volume resistivity of the belt A6 and the surface resistivity of its outer circumferential surface are measured using the above-described methods. The common logarithm of the volume resistivity is 9.6 (log Ω·cm), and the common logarithm of the surface resistivity is 10.0 (log Ω/sq.).

The difference between the SP value of the resin contained in the belt A6 and the SP value of the surface modifier (i.e., the SP difference) is shown in Table 1.

Example A7

<Production of Belt A7>

—Preparation of Coating Solution A2—

Carbon black particles and a surface modifier are added to an aromatic polyamide-imide vanish (solid content: 18% by mass, HPC-9000 manufactured by Hitachi Chemical Co., Ltd., solvent: NMP) such that the amount of the carbon black particles added and the amount of the surface modifier with respect to 100 parts by mass of the solid aromatic polyamide-imide are as described below. These components are dispersed, mixed, and stirred to thereby obtain a coating solution A2.

Carbon black particles [Color Black FW200 manufactured by Orion Engineered Carbons, gas black (i.e., channel black), number average primary particle diameter: 13 nm, pH: 3.0 (hereinafter abbreviated as "FW200")] 18 parts by mass Surface modifier [product name: KP126 manufactured by Shin-Etsu Chemical Co., Ltd., type: polyether-modified dimethyl silicone, SP value: 8.6, thermal decomposition starting temperature: 264° C.] An amount giving a content shown in Table 1 ("Content" in Table 1) based on 100 parts by mass of the total of the resin and the surface modifier contained in a layer to be formed.

An endless belt A7 is obtained under the same application, drying, and firing conditions as those for the endless belt A1 except that the coating solution A1 is changed to the coating solution A2.

The endless belt A7 is cut in the same manner as that for the endless belt A1 to obtain an annular member with a diameter ϕ of 366 mm, a width of 369 mm, and a thickness of 80 μm. The thus-obtained endless belt is used as a belt A7.

The volume resistivity of the belt A7 and the surface resistivity of its outer circumferential surface are measured using the above-described methods. The common logarithm of the volume resistivity is 9.6 (log Ω·cm), and the common logarithm of the surface resistivity is 10.0 (log Ω/sq.).

The difference between the SP value of the resin contained in the belt A7 and the SP value of the surface modifier (i.e., the SP difference) is shown in Table 1.

Example B1

<Production of Belt B1>

An endless belt B1 is obtained in the same manner as that for the endless belt A1 except that the surface modifier used for the coating solution A1 is changed to a different surface modifier (product name: FTERGENT 601ADH2 manufactured by NEOS Company Limited, type: perfluoropropene oligomer, SP value: 8.9, thermal decomposition starting temperature: 270° C.) and that the surface modifier is added in such an amount that its content based on 100 parts by mass of the total of the resin and the surface modifier contained in the layer formed is an amount shown in Table 2 ("Content" in Table 2).

The endless belt B1 is cut in the same manner as that for the endless belt A1 to obtain an annular member with a diameter ϕ of 366 mm, a width of 369 mm, and a thickness of 80 μm. The thus-obtained endless belt is used as a belt B1.

The volume resistivity of the belt B1 and the surface resistivity of its outer circumferential surface are measured using the above-described methods. The common logarithm of the volume resistivity is 9.7 (log Ω·cm), and the common logarithm of the surface resistivity is 10.2 (log Ω/sq.).

The difference between the SP value of the resin contained in the belt B1 and the SP value of the surface modifier (i.e., the SP difference) is shown in Table 2.

Example B2

<Production of Belt B2>

An endless belt B2 is obtained in the same manner as that for the endless belt B1 except that, in the drying step for the belt B1, the drying treatment is performed at 140° C. in an air atmosphere for 30 minutes instead of at 110° C. in an air atmosphere for 67 minutes.

The endless belt B2 is cut in the same manner as that for the endless belt B1 to obtain an annular member with a diameter ϕ of 366 mm, a width of 369 mm, and a thickness of 80 μm. The thus-obtained endless belt is used as a belt B2.

The volume resistivity of the belt B2 and the surface resistivity of its outer circumferential surface are measured using the above-described methods. The common logarithm of the volume resistivity is 9.9 (log Ω·cm), and the common logarithm of the surface resistivity is 10.3 (log Ω/sq.).

Example B3

<Production of Belt B3>

An endless belt B3 is obtained in the same manner as that for the endless belt B1 except that, in the drying step for the belt B1, the drying treatment is performed at 170° C. in an air atmosphere for 13 minutes instead of at 110° C. in an air atmosphere for 67 minutes.

The endless belt B3 is cut in the same manner as that for the endless belt B1 to obtain an annular member with a diameter ϕ of 366 mm, a width of 369 mm, and a thickness of 80 μm. The thus-obtained endless belt is used as a belt B3.

The volume resistivity of the belt B3 and the surface resistivity of its outer circumferential surface are measured using the above-described methods. The common logarithm of the volume resistivity is 10.0 (log Ω·cm), and the common logarithm of the surface resistivity is 10.4 (log Ω/sq.).

Example B4

<Production of Belt B4>

An endless belt B4 is obtained in the same manner as that for the endless belt A1 except that the surface modifier used for the coating solution A1 is changed to a different surface modifier (product name: FTERGENT 601ADH2 manufactured by NEOS Company Limited, type: perfluoropropene oligomer, SP value: 8.9, thermal decomposition starting temperature: 270° C.) and that the surface modifier is added in such an amount that its content based on 100 parts by mass of the total of the resin and the surface modifier contained in the layer formed is an amount shown in Table 2 ("Content" in Table 2).

The endless belt B4 is cut in the same manner as that for the endless belt A1 to obtain an annular member with a diameter ϕ of 366 mm, a width of 369 mm, and a thickness of 80 μm. The thus-obtained endless belt is used as a belt B4.

The volume resistivity of the belt B4 and the surface resistivity of its outer circumferential surface are measured using the above-described methods. The common logarithm of the volume resistivity is 9.7 (log Ω·cm), and the common logarithm of the surface resistivity is 10.1 (log Ω/sq.).

Example B5

<Production of Belt B5>

An endless belt B5 is obtained in the same manner as that for the endless belt A1 except that the surface modifier used for the coating solution A1 is changed to a different surface modifier (product name: FTERGENT 601ADH2 manufactured by NEOS Company Limited, type: perfluoropropene oligomer, SP value: 8.9, thermal decomposition starting temperature: 270° C.) and that the surface modifier is added in such an amount that its content based on 100 parts by mass of the total of the resin and the surface modifier contained in the layer formed is an amount shown in Table 2 ("Content" in Table 2).

The endless belt B5 is cut in the same manner as that for the endless belt A1 to obtain an annular member with a diameter ϕ of 366 mm, a width of 369 mm, and a thickness of 80 μm. The thus-obtained endless belt is used as a belt B5.

The volume resistivity of the belt B5 and the surface resistivity of its outer circumferential surface are measured using the above-described methods. The common logarithm of the volume resistivity is 9.9 (log Ω·cm), and the common logarithm of the surface resistivity is 10.2 (log Ω/sq.).

Example B6

<Production of Belt B6>

An endless belt B6 is obtained in the same manner as that for the endless belt A1 except that the surface modifier used for the coating solution A1 is changed to a different surface modifier (product name: FC-4432 manufactured by 3M, type: perfluorobutane sulfonic acid, SP value: 8.7, thermal decomposition starting temperature: 253° C.) and that the surface modifier is added in such an amount that its content based on 100 parts by mass of the total of the resin and the surface modifier contained in the layer formed is an amount shown in Table 2 ("Content" in Table 2).

The endless belt B6 is cut in the same manner as that for the endless belt A1 to obtain an annular member with a diameter ϕ of 366 mm, a width of 369 mm, and a thickness of 80 μm. The thus-obtained endless belt is used as a belt B6.

The volume resistivity of the belt B6 and the surface resistivity of its outer circumferential surface are measured using the above-described methods. The common logarithm of the volume resistivity is 9.6 (log Ω·cm), and the common logarithm of the surface resistivity is 10.1 (log Ω/sq.).

The difference between the SP value of the resin contained in the belt B6 and the SP value of the surface modifier (i.e., the SP difference) is shown in Table 2.

Example B7

<Production of Belt B7>

An endless belt B7 is obtained in the same manner as that for the endless belt A7 except that the surface modifier used for the coating solution A2 is changed to a different surface modifier (product name: FTERGENT 601ADH2 manufactured by NEOS Company Limited, type: perfluoropropene oligomer, SP value: 8.9, thermal decomposition starting temperature: 270° C.) and that the surface modifier is added in such an amount that its content based on 100 parts by mass of the total of the resin and the surface modifier contained in the layer formed is an amount shown in Table 2 ("Content" in Table 2).

The endless belt B7 is cut in the same manner as that for the endless belt A7 to obtain an annular member with a diameter ϕ of 366 mm, a width of 369 mm, and a thickness of 80 μm. The thus-obtained endless belt is used as a belt B7.

The volume resistivity of the belt B7 and the surface resistivity of its outer circumferential surface are measured using the above-described methods. The common logarithm of the volume resistivity is 9.7 (log Ω·cm), and the common logarithm of the surface resistivity is 10.2 (log Ω/sq.).

The difference between the SP value of the resin contained in the belt B7 and the SP value of the surface modifier (i.e., the SP difference) is shown in Table 2.

Comparative Example C1

<Production of Belt C1>

An endless belt C1 is obtained in the same manner as that for the endless belt A1 except that the surface modifier (product name: KP126) used for the coating solution A1 is added in such an amount that its content based on 100 parts by mass of the total of the resin and the surface modifier contained in the layer formed is an amount shown in Table 3 ("Content" in Table 3) and that, in the drying step for the belt A1, the drying treatment is performed at 210° C. in an air atmosphere for 9 minutes instead of at 110° C. in an air atmosphere for 67 minutes.

The endless belt C1 is cut in the same manner as that for the endless belt A1 to obtain an annular member with a diameter ϕ of 366 mm, a width of 369 mm, and a thickness of 80 μm. The thus-obtained endless belt is used as a belt C1.

The volume resistivity of the belt C1 and the surface resistivity of its outer circumferential surface are measured using the above-described methods. The common logarithm of the volume resistivity is 9.5 (log Ω·cm), and the common logarithm of the surface resistivity is 10.3 (log Ω/sq.).

Comparative Example C2

<Production of Belt C2>

An endless belt C2 is obtained in the same manner as that for the endless belt A3 except that the surface modifier (product name: KP126) used for the coating solution A1 is added in such an amount that its content based on 100 parts by mass of the total of the resin and the surface modifier contained in the layer formed is an amount shown in Table 3 ("Content" in Table 3).

The endless belt C2 is cut in the same manner as that for the endless belt A3 to obtain an annular member with a diameter ϕ of 366 mm, a width of 369 mm, and a thickness of 80 μm. The thus-obtained endless belt is used as a belt C2.

The volume resistivity of the belt C2 and the surface resistivity of its outer circumferential surface are measured using the above-described methods. The common logarithm of the volume resistivity is 9.8 (log Ω·cm), and the common logarithm of the surface resistivity is 10.3 (log Ω/sq.).

Reference Example C3

<Production of Belt C3>

An endless belt C3 is obtained in the same manner as that for the endless belt A3 except that the surface modifier used for the coating solution A1 is changed to a different surface modifier (product name: KP120 manufactured by Shin-Etsu Chemical Co., Ltd., type: polyether-modified dimethyl silicone, SP value: 10.0, thermal decomposition starting temperature: 250° C.) and that the surface modifier is added in such an amount that its content based on 100 parts by mass of the total of the resin and the surface modifier contained in the layer formed is an amount shown in Table 3 ("Content" in Table 3).

The endless belt C3 is cut in the same manner as that for the endless belt A3 to obtain an annular member with a diameter ϕ of 366 mm, a width of 369 mm, and a thickness of 80 μm. The thus-obtained endless belt is used as a belt C3.

The volume resistivity of the belt C3 and the surface resistivity of its outer circumferential surface are measured using the above-described methods. The common logarithm of the volume resistivity is 9.3 (log Ω·cm), and the common logarithm of the surface resistivity is 9.8 (log Ω/sq.).

The difference between the SP value of the resin contained in the belt C3 and the SP value of the surface modifier (i.e., the SP difference) is shown in Table 3.

Comparative Example D1

<Production of Belt D1>

An endless belt D1 is obtained in the same manner as that for the endless belt A1 except that the surface modifier used for the coating solution A1 is changed to a different surface modifier (product name: FTERGENT 601ADH2 manufactured by NEOS Company Limited, type: perfluoropropene oligomer, SP value: 8.9, thermal decomposition starting temperature: 270° C.), that the surface modifier is added in such an amount that its content based on 100 parts by mass of the total of the resin and the surface modifier contained in the layer formed is an amount shown in Table 3 ("Content" in Table 3), and that, in the drying step for the belt A1, the drying treatment is performed at 210° C. in an air atmosphere for 9 minutes instead of at 110° C. in an air atmosphere for 67 minutes.

The endless belt D1 is cut in the same manner as that for the endless belt A1 to obtain an annular member with a diameter ϕ of 366 mm, a width of 369 mm, and a thickness of 80 μm. The thus-obtained endless belt is used as a belt D1.

The volume resistivity of the belt D1 and the surface resistivity of its outer circumferential surface are measured using the above-described methods. The common logarithm of the volume resistivity is 9.9 (log Ω·cm), and the common logarithm of the surface resistivity is 10.3 (log Ω/sq.).

Comparative Example D2

<Production of Belt D2>

An endless belt D2 is obtained in the same manner as that for the endless belt A1 except that the surface modifier used for the coating solution A1 is changed to a different surface modifier (product name: FTERGENT 601ADH2 manufactured by NEOS Company Limited, type: perfluoropropene oligomer, SP value: 8.9, thermal decomposition starting temperature: 270° C.), that the surface modifier is added in such an amount that its content based on 100 parts by mass of the total of the resin and the surface modifier contained in the layer formed is an amount shown in Table 3 ("Content" in Table 3), and that, in the drying step for the belt A1, the drying treatment is performed at 170° C. in an air atmosphere for 13 minutes instead of at 110° C. in an air atmosphere for 67 minutes.

The endless belt D2 is cut in the same manner as that for the endless belt A1 to obtain an annular member with a diameter ϕ of 366 mm, a width of 369 mm, and a thickness of 80 μm. The thus-obtained endless belt is used as a belt D2.

The volume resistivity of the belt D2 and the surface resistivity of its outer circumferential surface are measured using the above-described methods. The common logarithm of the volume resistivity is 9.8 (log Ω·cm), and the common logarithm of the surface resistivity is 10.2 (log Ω/sq.).

Reference Example D3

<Production of Belt D3>

An endless belt D3 is obtained in the same manner as that for the endless belt B6 except that the surface modifier used for the coating solution A1 is changed to a different surface modifier (product name: FC-4430 manufactured by 3M, type: perfluorobutane sulfonic acid, SP value: 9.5, thermal decomposition starting temperature: 230° C.) and that the surface modifier is added in such an amount that its content based on 100 parts by mass of the total of the resin and the surface modifier contained in the layer formed is an amount shown in Table 3 ("Content" in Table 3).

The endless belt D3 is cut in the same manner as that for the endless belt B6 to obtain an annular member with a diameter ϕ of 366 mm, a width of 369 mm, and a thickness of 80 μm. The thus-obtained endless belt is used as a belt D3.

The volume resistivity of the belt D3 and the surface resistivity of its outer circumferential surface are measured using the above-described methods. The common logarithm of the volume resistivity is 9.4 (log Ω·cm), and the common logarithm of the surface resistivity is 9.8 (log Ω/sq.).

The difference between the SP value of the resin contained in the belt D3 and the SP value of the surface modifier (i.e., the SP difference) is shown in Table 3.

[Evaluation of Properties of Endless Belts]

For each of the endless belts obtained in the Examples, the following properties are determined by the methods described above. The results are shown in Tables 1 to 3.

SP difference (the difference between the SP value of the resin and the SP value of the surface modifier)

Area fraction of the island portions (%)

Average equivalent circle diameter of the island portions (nm)

Particle separation pressure (kPa)

In all the Examples and Comparative Examples, the sea-island structure including the sea portion containing the resin and the island portions containing the surface modifier in an amount of 10% by mass or more is found.

The type of resin contained in the single layer, the type of surface modifier contained in the single layer, the content of the surface modifier, and the drying temperature in the first drying step are also shown in Tables 1 to 3.

[Evaluation of Endless Belts]

<Evaluation of Transferability onto Non-Smooth Paper Sheet>

One of the endless belts obtained in the Examples is installed as the intermediate transfer belt in "an apparatus obtained by modifying DocuColor-7171P (i.e., a modified apparatus obtained by attaching the intermediate transfer belt and adjusting a cleaning blade according to the thickness of the belt)." Then a blue solid image is formed on a non-smooth paper sheet (LEATHAC 66, 204 gsm) in an environment at a temperature of 22° C. and a humidity of 55% RH under the condition of a recording medium conveying speed of 366 mm/s in the second transfer region, and white patches in recessed portions are visually evaluated. The evaluation criteria are shown below, and the results are shown in Tables 1 to 3.

The first transfer roller used is an electrically conductive roller (1) described below.

The contact width between the intermediate transfer belt and the second transfer roller is set to 1.0 cm.

The toner used has a volume average particle diameter of 4.7 μm.

—Evaluation Criteria—

A: No white patches occur.

B: Slight color changes occur.

B−: Although no distinct color changes occur, the degree of color changes is larger than that in B.

C: Distinct color changes occur.

D: White patches occur.

<Production of Electrically Conductive Roller (1)>

Epichlorohydrin-allyl glycidyl ether binary copolymer (ECO) (product name: GECHRON manufactured by ZEON CORPORATION) 40 parts by mass Acrylonitrile-butadiene rubber (NBR) (product name: Nipol DN223 manufactured by ZEON CORPORATION) 60 parts by mass Foaming agent (benzenesulfonyl hydrazide) 6 parts by mass Vulcanizing agent (product name: sulfur 200 mesh manufactured by Tsurumi Chemical Industry Co., ltd.) 1 part by mass Vulcanizing accelerator (product name: NOCCELER M manufactured by OUCHI SHINKO CHEMICAL INDUSTRIAL CO., LTD.) 1.5 parts by mass A rubber composition containing the above components is kneaded using an open roll mill. The kneaded rubber composition is extruded into a shape with a central hole (a donut shape) to form a hollow cylindrical roller. Then the hollow cylindrical roller is heated to 160° C. for 20 minutes to vulcanize and foam the composition, and the electrically conductive roller (1) is thereby obtained.

TABLE 1

| | | Surface modifier | | Drying temperature (° C.) | SP difference | Endless belt | | | |
|---|---|---|---|---|---|---|---|---|---|
| | Resin | Type | Content (parts) | | | Area fraction of island portions (%) | Average equivalent circle diameter of island portions (μm) | Particle separation pressure (kPa) | Evaluation |
| Example A1 | PI | KP126 | 3.0 | 110 | 4.8 | 1.4 | 0.3 | 4.3 | A |
| Example A2 | PI | KP126 | 3.0 | 140 | 4.8 | 2.5 | 0.7 | 4.4 | A |
| Example A3 | PI | KP126 | 3.0 | 170 | 4.8 | 4.7 | 1.2 | 4.3 | B |
| Example A4 | PI | KP126 | 1.0 | 110 | 4.8 | 0.9 | 0.2 | 5.0 | B– |
| Example A5 | PI | KP126 | 10.0 | 110 | 4.8 | 4.8 | 1.4 | 2.0 | B– |
| Example A6 | PI | KP101 | 1.5 | 110 | 4.7 | 1.2 | 0.2 | 5.9 | B |
| Example A7 | PAI | KP126 | 3.0 | 110 | 5.0 | 1.4 | 0.3 | 4.6 | B |

TABLE 2

| | | Surface modifier | | Drying temperature (° C.) | SP difference | Endless belt | | | |
|---|---|---|---|---|---|---|---|---|---|
| | Resin | Type | Content (parts) | | | Area fraction of island portions (%) | Average equivalent circle diameter of island portions (μm) | Particle separation pressure (kPa) | Evaluation |
| Example B1 | PI | FTERGENT 601ADH2 | 8.0 | 110 | 4.5 | 2.5 | 0.7 | 2.2 | A |
| Example B2 | PI | FTERGENT 601ADH2 | 8.0 | 140 | 4.5 | 3.2 | 0.9 | 2.3 | A |
| Example B3 | PI | FTERGENT 601ADH2 | 8.0 | 170 | 4.5 | 4.5 | 1.1 | 2.3 | B |
| Example B4 | PI | FTERGENT 601ADH2 | 1.0 | 110 | 4.5 | 0.9 | 0.1 | 5.6 | B |
| Example B5 | PI | FTERGENT 601ADH2 | 10.0 | 110 | 4.5 | 4.8 | 1.4 | 2.1 | B |
| Example B6 | PI | FC-4432 | 10.0 | 110 | 4.7 | 4.8 | 1.5 | 2.2 | B |
| Example B7 | PAI | FTERGENT 601ADH2 | 8.0 | 110 | 4.7 | 2.6 | 1.1 | 2.3 | A |

TABLE 3

| | | Surface modifier | | Drying temperature (° C.) | SP difference | Endless belt | | | |
|---|---|---|---|---|---|---|---|---|---|
| | | | | | | Area fraction of island portions (%) | Average equivalent circle diameter of island portions (μm) | Particle separation pressure (kPa) | Evaluation |
| | Resin | Type | Content (parts) | | | | | | |
| Comparative Example C1 | PI | KP126 | 9.0 | 210 | 4.8 | 28 | 1.9 | 2.2 | D |
| Comparative Example C2 | PI | KP126 | 12.0 | 170 | 4.8 | 31 | 2.1 | 2.3 | D |
| Reference Example C3 | PI | KP120 | 9.0 | 170 | 3.4 | 10 | 1.4 | 4.3 | C |
| Comparative Example D1 | PI | FTERGENT 601ADH2 | 9.0 | 210 | 4.5 | 26 | 1.9 | 2.2 | C |
| Comparative Example D2 | PI | FTERGENT 601ADH2 | 12.0 | 170 | 4.5 | 31 | 2.0 | 2.1 | D |
| Reference Example D3 | PI | FC-4430 | 9.0 | 110 | 3.9 | 10 | 1.5 | 4.0 | C |

As can be seen from the above results, the transferability onto a non-smooth paper sheet is better in each Example than in each Comparative Example.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An endless belt comprising:
a resin selected from the group consisting of polyimide resin, polyamide-imide resin, aromatic polyether ether ketone resin, polyetherimide resin, and polyphenylene sulfide resin; and
a surface modifier,
wherein the endless belt has, at an outer circumferential surface thereof, a sea-island structure including a sea portion containing the resin and island portions containing the surface modifier, and
wherein an area of the island portions is equal to or less than 5% of the total area of the outer circumferential surface.

2. The endless belt according to claim 1, wherein the island portions have an average equivalent circle diameter of 1.5 μm or less.

3. The endless belt according to claim 2, wherein the surface modifier includes at least one selected from the group consisting of a surface modifier having a silicone structure and a surface modifier having a fluorine atom.

4. The endless belt according to claim 3, wherein the surface modifier includes modified dimethyl silicone as the surface modifier having a silicone structure.

5. The endless belt according to claim 4, wherein the modified dimethyl silicone has a thermal decomposition starting temperature of 200° C. or higher.

6. The endless belt according to claim 4, wherein the content of the modified dimethyl silicone is from 1 part by mass to 10 parts by mass inclusive based on 100 parts by mass of the total of the resin and the surface modifier.

7. The endless belt according to claim 1, wherein the surface modifier includes at least one selected from the group consisting of a surface modifier having a silicone structure and a surface modifier having a fluorine atom.

8. The endless belt according to claim 7, wherein the surface modifier includes modified dimethyl silicone as the surface modifier having a silicone structure.

9. The endless belt according to claim 8, wherein the modified dimethyl silicone has a thermal decomposition starting temperature of 200° C. or higher.

10. The endless belt according to claim 8, wherein the content of the modified dimethyl silicone is from 1 part by mass to 10 parts by mass inclusive based on 100 parts by mass of the total of the resin and the surface modifier.

11. The endless belt according to claim 7, wherein the surface modifier includes a compound having a perfluoroalkyl group as the surface modifier having a fluorine atom.

12. The endless belt according to claim 11, wherein the compound having a perfluoroalkyl group has a thermal decomposition starting temperature of 200° C. or higher.

13. The endless belt according to claim 11, wherein the content of the compound having a perfluoroalkyl group is from 0.5 parts by mass to 10 parts by mass inclusive based on 100 parts by mass of the total of the resin and the surface modifier.

14. The endless belt according to claim 1, wherein the difference between the Hansen solubility parameter of the resin and the solubility parameter of the surface modifier is 7 or less.

15. A transfer device comprising:
an intermediate transfer body having an outer circumferential surface onto which a toner image is to be transferred, the intermediate transfer body including the endless belt according to claim 1;
a first transfer unit including a first transfer member that first-transfers a toner image formed on a surface of an image holding member onto the outer circumferential surface of the intermediate transfer body; and
a second transfer unit including a second transfer member that is disposed in contact with the outer circumferential surface of the intermediate transfer body and second-transfers the toner image transferred onto the outer circumferential surface of the intermediate transfer body onto a surface of a recording medium.

16. An image forming apparatus comprising:
a toner image forming device that includes an image holding member and forms a toner image on a surface of the image holding member; and
a transfer device that transfers the toner image formed on the surface of the image holding member onto a surface of a recording medium, the transfer device being the transfer device according to claim 15.

17. An endless belt comprising:
a resin selected from the group consisting of polyimide resin, polyamide-imide resin, aromatic polyether ether ketone resin, polyetherimide resin, and polyphenylene sulfide resin; and
a surface modifier,
wherein the endless belt has, at an outer circumferential surface thereof, a sea-island structure including a sea portion containing the resin and island portions containing the surface modifier, and
wherein the island portions have an average equivalent circle diameter of 1.2 μm or less.

18. The endless belt according to claim 17, wherein the surface modifier includes at least one selected from the group consisting of a surface modifier having a silicone structure and a surface modifier having a fluorine atom.

19. The endless belt according to claim 18, wherein the surface modifier includes modified dimethyl silicone as the surface modifier having a silicone structure.

20. The endless belt according to claim 19, wherein the modified dimethyl silicone has a thermal decomposition starting temperature of 200° C. or higher.

21. An endless belt comprising:
a resin; and
a surface modifier having a silicone structure,
wherein the endless belt has, at an outer circumferential surface thereof, a sea-island structure including a sea portion containing the resin and island portions containing the surface modifier, and
wherein an area of the island portions is equal to or less than 5% of the total area of the outer circumferential surface.

* * * * *